US009585069B2

(12) United States Patent
Prakash et al.

(10) Patent No.: US 9,585,069 B2
(45) Date of Patent: Feb. 28, 2017

(54) ACCESS TERMINAL ASSISTED NODE IDENTIFIER CONFUSION RESOLUTION

(75) Inventors: Rajat Prakash, La Jolla, CA (US);
Rajarshi Gupta, Santa Clara, CA (US);
Parag A. Agashe, San Diego, CA (US);
Masato Kitazoe, Hachiouji (JP);
Arnaud Meylan, Bois-Colombes (FR);
Gavin B. Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 664 days.

(21) Appl. No.: 12/486,658

(22) Filed: Jun. 17, 2009

(65) Prior Publication Data

US 2009/0316655 A1 Dec. 24, 2009

Related U.S. Application Data

(60) Provisional application No. 60/074,114, filed on Jun. 19, 2008, provisional application No. 61/087,592, (Continued)

(51) Int. Cl.
*H04W 4/00* (2009.01)
*H04W 36/00* (2009.01)
(Continued)

(52) U.S. Cl.
CPC ...... *H04W 36/0088* (2013.01); *H04W 84/045* (2013.01)

(58) Field of Classification Search
None
See application file for complete search history.

(56) References Cited

U.S. PATENT DOCUMENTS

| 5,345,467 A | 9/1994 | Lomp et al. |
| 5,519,706 A | 5/1996 | Bantz et al. |

(Continued)

FOREIGN PATENT DOCUMENTS

| CN | 1568043 A | 1/2005 |
| CN | 1691828 A | 11/2005 |

(Continued)

OTHER PUBLICATIONS

Ericsson: "Automatic neighbour cell configuration" 3GPP Draft; S5-071484, 3rd Generation Partnership Project (3GPP), Mobile Competence Centre; Sophia-Antipolis Cedex ; France, (Aug. 2007), XP050306143, paragraph 3.4.

(Continued)

*Primary Examiner* — Eunsook Choi

(57) ABSTRACT

Confusion resulting from assigning the same node identifier to multiple nodes is resolved through the use of confusion detection techniques and the use of unique identifiers for the nodes. In some aspects a network may provide a time gap (e.g., an asynchronous time gap) during which an access terminal may temporarily cease monitoring transmissions from a source node so that the access terminal may acquire a unique identifier from a target node. In some aspects an access terminal may commence handover operations at a target node after determining whether the access terminal is allowed to access the target node. In some aspects a source node may prepare several target nodes for potential handover in the event confusion is detected or likely. Here, the source node may send information relating to the preparation of the potential target nodes to the access terminal whereby the access terminal uses the handover preparation information to initiate a handover at that target node.

74 Claims, 26 Drawing Sheets

Related U.S. Application Data filed on Aug. 8, 2008, provisional application No. 61/156,805, filed on Mar. 2, 2009.

(51) Int. Cl.
  *H04L 12/28* (2006.01)
  *H04W 84/04* (2009.01)

(56) References Cited

U.S. PATENT DOCUMENTS

| | | |
|---|---|---|
| 5,722,073 A | 2/1998 | Wallstedt et al. |
| 6,032,047 A | 2/2000 | Cerwall et al. |
| 6,044,272 A | 3/2000 | Kobylinski et al. |
| 6,061,337 A | 5/2000 | Light et al. |
| 6,201,969 B1 | 3/2001 | Meier |
| 6,253,083 B1 | 6/2001 | Hacena et al. |
| 6,285,874 B1 | 9/2001 | Magnusson et al. |
| 6,353,602 B1 | 3/2002 | Cheng et al. |
| 6,522,881 B1 | 2/2003 | Feder et al. |
| 6,553,230 B1 | 4/2003 | Plestid et al. |
| 6,597,671 B1 | 7/2003 | Ahmadi et al. |
| 6,615,050 B1 | 9/2003 | Tiedemann, Jr. et al. |
| 6,680,920 B1 | 1/2004 | Wan |
| 6,873,612 B1 | 3/2005 | Steer et al. |
| 7,310,518 B2 | 12/2007 | Chambers |
| 7,596,378 B1* | 9/2009 | Nizri et al. ................... 455/448 |
| 7,813,320 B2 | 10/2010 | Kim et al. |
| 7,876,729 B1 | 1/2011 | Grilli et al. |
| 8,027,681 B2 | 9/2011 | Burgess et al. |
| 8,400,979 B2 | 3/2013 | Smee et al. |
| 9,094,880 B2 | 7/2015 | Prakash et al. |
| 2001/0000136 A1 | 4/2001 | Dixon et al. |
| 2004/0063428 A1 | 4/2004 | Jansson |
| 2004/0138807 A1 | 7/2004 | Jha et al. |
| 2004/0203863 A1* | 10/2004 | Huomo .................. H04W 4/02 455/456.1 |
| 2004/0240474 A1 | 12/2004 | Fan |
| 2005/0030924 A1 | 2/2005 | Yano et al. |
| 2005/0048922 A1 | 3/2005 | Lee et al. |
| 2005/0124345 A1 | 6/2005 | Laroia et al. |
| 2005/0148368 A1 | 7/2005 | Scheinert et al. |
| 2005/0243772 A1 | 11/2005 | Lee et al. |
| 2006/0056351 A1 | 3/2006 | Wall |
| 2006/0098752 A1 | 5/2006 | Song et al. |
| 2006/0121900 A1 | 6/2006 | Idnani et al. |
| 2006/0146751 A1 | 7/2006 | Obuchi et al. |
| 2006/0172707 A1 | 8/2006 | Stern-Berkowitz et al. |
| 2006/0227754 A1 | 10/2006 | Ko |
| 2006/0234713 A1 | 10/2006 | Oswal et al. |
| 2006/0280141 A1 | 12/2006 | McBeath et al. |
| 2007/0097897 A1 | 5/2007 | Teague et al. |
| 2007/0097914 A1 | 5/2007 | Grilli et al. |
| 2007/0097938 A1 | 5/2007 | Nylander et al. |
| 2007/0097939 A1 | 5/2007 | Nylander et al. |
| 2007/0135147 A1 | 6/2007 | DeClerck et al. |
| 2007/0153728 A1 | 7/2007 | Le et al. |
| 2007/0213086 A1 | 9/2007 | Claussen et al. |
| 2007/0287501 A1 | 12/2007 | Hoshina et al. |
| 2007/0291699 A1 | 12/2007 | Lee et al. |
| 2007/0291728 A1 | 12/2007 | Dalsgaard et al. |
| 2007/0298803 A1 | 12/2007 | Kawabata et al. |
| 2008/0013489 A1 | 1/2008 | Anigstein et al. |
| 2008/0014926 A1 | 1/2008 | Ono |
| 2008/0076425 A1 | 3/2008 | Khetawat et al. |
| 2008/0132239 A1* | 6/2008 | Khetawat et al. ............ 455/438 |
| 2008/0146226 A1 | 6/2008 | Claussen et al. |
| 2008/0153497 A1 | 6/2008 | Kalhan |
| 2008/0159222 A1 | 7/2008 | Akram et al. |
| 2008/0207207 A1 | 8/2008 | Moe et al. |
| 2008/0227458 A1 | 9/2008 | Wu |
| 2008/0267153 A1 | 10/2008 | Mukherjee et al. |
| 2008/0280620 A1 | 11/2008 | Chin et al. |
| 2009/0016314 A1 | 1/2009 | Kim |
| 2009/0047955 A1 | 2/2009 | Frenger et al. |
| 2009/0047956 A1 | 2/2009 | Moe et al. |
| 2009/0047960 A1 | 2/2009 | Gunnarsson et al. |
| 2009/0052395 A1 | 2/2009 | Bao et al. |
| 2009/0052418 A1 | 2/2009 | Semper |
| 2009/0088161 A1 | 4/2009 | Narasimha et al. |
| 2009/0092107 A1 | 4/2009 | Cai et al. |
| 2009/0093252 A1 | 4/2009 | Czaja et al. |
| 2009/0097448 A1 | 4/2009 | Vasudevan et al. |
| 2009/0097451 A1 | 4/2009 | Gogic |
| 2009/0132674 A1* | 5/2009 | Horn et al. ................... 709/207 |
| 2009/0132675 A1* | 5/2009 | Horn et al. ................... 709/207 |
| 2009/0156208 A1 | 6/2009 | Vesterinen et al. |
| 2009/0168745 A1* | 7/2009 | Ahmadi et al. ............... 370/350 |
| 2009/0176490 A1 | 7/2009 | Kazmi et al. |
| 2009/0196253 A1 | 8/2009 | Semper |
| 2009/0219888 A1 | 9/2009 | Chen et al. |
| 2009/0233607 A1 | 9/2009 | Claussen et al. |
| 2009/0252125 A1 | 10/2009 | Vujcic |
| 2009/0270092 A1 | 10/2009 | Buckley et al. |
| 2009/0270097 A1* | 10/2009 | Gallagher et al. ......... 455/435.1 |
| 2009/0275333 A1 | 11/2009 | Ishii et al. |
| 2009/0280819 A1 | 11/2009 | Brisebois et al. |
| 2009/0298515 A1 | 12/2009 | Czaja et al. |
| 2009/0312024 A1 | 12/2009 | Chen et al. |
| 2009/0316654 A1 | 12/2009 | Prakash et al. |
| 2010/0040019 A1 | 2/2010 | Tinnakornsrisuphap et al. |
| 2010/0040038 A1 | 2/2010 | Tinnakornsrisuphap et al. |
| 2010/0130199 A1* | 5/2010 | Piercy et al. ................. 455/434 |
| 2010/0216426 A1 | 8/2010 | Karim et al. |
| 2010/0260068 A1 | 10/2010 | Bhatt et al. |
| 2011/0014920 A1 | 1/2011 | Nylander et al. |
| 2011/0039557 A1 | 2/2011 | Narasimha et al. |
| 2011/0051658 A1* | 3/2011 | Jin et al. ....................... 370/328 |
| 2011/0263274 A1* | 10/2011 | Fox et al. .................. 455/456.2 |
| 2015/0140993 A1 | 5/2015 | Horn et al. |

FOREIGN PATENT DOCUMENTS

| | | |
|---|---|---|
| CN | 1934884 A | 3/2007 |
| CN | 101014156 A | 8/2007 |
| EP | 1107637 A1 | 6/2001 |
| EP | 1928194 A1 | 6/2008 |
| EP | 2079263 A1 | 7/2009 |
| JP | 2000312379 A | 11/2000 |
| JP | 2002525913 A | 8/2002 |
| JP | 2003219459 A | 7/2003 |
| JP | 2004140459 A | 5/2004 |
| JP | 2006141031 A | 6/2006 |
| JP | 2008005074 A | 1/2008 |
| JP | 2008053870 A | 3/2008 |
| JP | 2008092179 A | 4/2008 |
| JP | 2008118227 A | 5/2008 |
| JP | 2010500793 A | 1/2010 |
| JP | 2010514352 A | 4/2010 |
| JP | 2010517366 A | 5/2010 |
| KR | 20060128694 A | 12/2006 |
| KR | 20070051954 A | 5/2007 |
| KR | 100777096 B1 | 11/2007 |
| RU | 2209528 C2 | 7/2003 |
| RU | 2265287 C2 | 11/2005 |
| RU | 2316894 C2 | 2/2008 |
| RU | 2341900 C2 | 12/2008 |
| TW | 200820809 A | 5/2008 |
| WO | WO9637079 | 11/1996 |
| WO | WO9839940 | 9/1998 |
| WO | 0016518 A2 | 3/2000 |
| WO | WO0243430 | 5/2002 |
| WO | WO2004010607 A1 | 1/2004 |
| WO | WO-2004114695 A1 | 12/2004 |
| WO | 2005029894 A | 3/2005 |
| WO | WO2005078966 A1 | 8/2005 |
| WO | 2005107169 A1 | 11/2005 |
| WO | WO2007010304 | 1/2007 |
| WO | WO-2007094320 A1 | 8/2007 |
| WO | WO2007103062 A1 | 9/2007 |
| WO | WO2007113154 A1 | 10/2007 |
| WO | 2008019557 A1 | 2/2008 |
| WO | WO2008055251 | 5/2008 |
| WO | WO2008073554 | 6/2008 |
| WO | WO2008076222 | 6/2008 |

(56) References Cited

FOREIGN PATENT DOCUMENTS

| WO | WO2008094333 A1 | 8/2008 |
|---|---|---|
| WO | WO2008104196 | 9/2008 |
| WO | WO2009064647 | 5/2009 |
| WO | WO2009067454 | 5/2009 |

OTHER PUBLICATIONS

Ericsson: "MCI conflict detection and resolution" 3GPP Draft; S5-071569, 3rd Generation Partnership Project (3GPP), Mobile Competence Centre; Sophia-Antipolis Cedex; France, XP050306211, (Aug. 2007).

Huawei: "Detection of conflicting cell identities" 3GPP Draft; R3-071947, 3rd Generation Partnership Project (3GPP), Mobile Competence Centre; Sophia-Antipolis Cedex ; France , XP050162733 [retrieved on Oct. 3, 2007] the whole document.

International Search Report—PCT/US2009/048054, International Search Authority—European Patent Office—Nov. 18, 2009.

Panasonic: "UE access control i n CSG cell " 3GPP Draft; R2-082238, 3rd Generation Partnership Project (3GPP), Kansas City, USA, XP050140005, figures 1-3 paragraph [2.1]—paragraph [2.3], (Apr. 29, 2008).

QUALCOMM Europe and T-Mobile: "Inter-RAT/frequency Automatic Neighbour Relation Function" 3GPP Draft TSG RAN#60; R2-074907, 3rd Generation Partnership Project (3GPP), Jeju, South Korea, XP050137407 figure 1 p. 2-p. 3, (Nov. 5-9, 2007).

QUALCOMM Europe (Email Rapporteur): "Summary of email discussion on Home eNB inbound mobility support [61b-LTE-B06]" 3GPP Draft TSG-RAN WG 2 meeting #62; R2-082270, 3RD Generation Partnership Project (3GPP), Kansas City, USA, XP050140027, (Apr. 29, 2008).

T-Mobile: "Automatic Neighbour Cell List Configuration—required Measurement and Signalling support, Templates according to R3-071730" 3GPP Drafttsg-RAN WG3 Meeting #57bis; R3-071936, 3RD Generation Partnership Project (3GPP), Sophia Antipolis, France, XP050162723, pp. 2-4, (Oct. 3, 2007).

ZTE: "Generation of Neighbour Relations" 3GPP Draft TSG-RAN WG3 Meeting #59; R3-080077, 3rd Generation Partnership Project (3GPP), Sorrento, Italy; XP050163310; [paragraph [0002]—paragraph [0004], (Feb. 2008).

Written Opinion—PCT/US2009/048054—ISA/EPO—Nov. 18, 2009.

Tinnakornsrisuphap, P., "Automatic Configuration Support for 1x and HRPD Femto", Qualcomm, A20-20080616-004r0, pp. 1-15, Jun. 2008.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP Standard; 3GPP TS 36.300,3rd Generation Partnership Project (3GPP), Mobile Competence Centre ; 650, Route Des Lucioles ; F-06921 Sophiaantipoliscedex ; France, No. V8.4.0, Mar. 1, 2008, pp. 1-126, XP050377579.

"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3RD Generation Partnership Project (3GPP), Mobile Competence Centre; 650, Route Des Lucioles ; F-06921 Sophia-Antipolis Cedex; France, No. V8.2.0, May 1, 2008, pp. 1-151, XP050377645.

Huawei, "Detection of conflicting cell identities", 3GPP TSG-RAN-WG2 Meeting #59bis, R2-074216, Oct. 2007, p. 1-p. 3, URL:http://www.3gpp.org.ftp/tsg_ran/WG2_RL2/TSGR2_TSGR2_59bis/Docs/R2-074216.zip.

QUALCOMM Europe: "Connected mode mobility in the presence of PCI confusion", 3GPP Draft; R3-090699, 3rd Generation Partnership Project (3GPP), Mobile Competence Centre ; 650, Route Des Lucioles ; F-06921 Sophia-Antipolis Cedex ; France, no. Seoul, Korea; 20090318, Mar. 18, 2009, XP050341086, [retrieved on Mar. 18, 2009].

QUALCOMM Europe et al.,"Network based solutions to inbound mobility in the presence of PCI confusion", 3GPP Draft; R3-091378, 3rd Generation Partnership Project (3GPP), Mobile Competence Centre ; 650, Route Des Lucioles ; F-06921 Sophia-Antipolis Cedex ; France, no. San Francisco, USA; 20090504, May 4, 2009, XP050341712, [retrieved on May 4, 2009].

QUALCOMM Europe,"Optimized handover in the presence of PCI confusion",3GPP Draft,R2-083268,3rd Generation Partnership Project (3GPP),Mobile Competence Centre,650,Route Des Lucioles,F-06921 Sophia-Antipolis Cedex ,France,vol. RAN WG2,no. Warsaw,Poland,20080624,Jun. 24, 2008,XP050140688.

Taiwan Search Report—TW098120671—TIPO—Nov. 20, 2013.

Telecom Italia, et al., "Way forward for handover to HeNB" 3GPP Draft; R2-084534, 3rd Generation Partnership Project (3GPP), Mobile Competence Centre ; 650, Route Des Lucioles ; F-06921 Sophia-Antipolis Cedex ; France, no. Jeju; 20080812, Aug. 12, 2008.

* cited by examiner

ACCESS TERMINAL ASSISTED NODE IDENTIFIER CONFUSION RESOLUTION

CLAIM OF PRIORITY UNDER 35 U.S.C §119

This application claims the benefit of and priority to commonly owned U.S. Provisional Patent Application No. 61/074,114, filed Jun. 19, 2008, and U.S. Provisional Patent Application No. 61/087,592, filed Aug. 8, 2008, and U.S. Provisional Patent Application No. 61/156,805, filed Mar. 2, 2009, the disclosure of each of which is hereby incorporated by reference herein.

CROSS-REFERENCE TO RELATED APPLICATION

This application is related to concurrently filed and commonly owned U.S. patent application Ser. No. 12/486,650 entitled "ACCESS TERMINAL ASSISTED NODE IDENTIFIER CONFUSION RESOLUTION USING A TIME GAP," the disclosure of which is hereby incorporated by reference herein.

BACKGROUND

Field

This application relates generally to communication and more specifically, but not exclusively, to resolving confusion associated with communication nodes.

Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations, small-coverage base stations may be deployed (e.g., installed in a user's home) to provide more robust indoor wireless coverage to mobile units. Such small-coverage base stations are generally known as access point base stations, Home NodeBs, Home eNodeBs, pico cells, or femto cells. Typically, such small-coverage base stations are connected to the Internet and the mobile operator's network via a DSL router or a cable modem.

In practice, a relatively large number of small-coverage base stations (e.g., femto cells) may be deployed in a given area (e.g., within the coverage area of a given macro cell). Consequently, two or more base stations that are close to one another may be assigned the same identifier since the number of available identifiers is typically limited (e.g. physical layer identifiers could be only 10 bits long). As a result, confusion may exist as to which base station (e.g., handover target) is being referenced when a node (e.g., an access terminal) in the network reports to its serving base station (e.g., handover source) that signals are being received from a base station having a given identifier. Moreover, as a result of such confusion, the source may not know if the access terminal has access privileges at the target since the source does not know the full identity of the target. Thus, there is a need for effective techniques for identifying base stations so that other nodes in the network may efficiently communicate with the base stations.

SUMMARY

A summary of sample aspects of the disclosure follows. It should be understood that any reference to the term aspects herein may refer to one or more aspects of the disclosure.

The disclosure relates in some aspects to resolving confusion associated with node identifiers. For example, a limited number of node identifiers may be defined within a network such that more than one node (e.g., access point) in the network may be assigned the same identifier. Accordingly, when an access terminal is being handed over from a serving node (e.g., source access point) to a target node (e.g., target access point), confusion may arise as to the identity the target node. Various techniques are described herein for resolving such confusion.

In some aspects an access terminal to be handed over to a target node may assist in resolving confusion relating to the target node by acquiring a unique identifier associated with the target node. Here, a unique identifier may be defined, for example, as an identifier that is globally unique, an identifier that is unique within a network, or an identifier that is more unique than another node identifier (e.g., an identifier with more bits than the other node identifier, but not necessarily fully unique within a network, globally, etc.). To facilitate the acquisition of the unique identifier by the access terminal, the network may provide a time gap during which the access terminal may temporarily cease monitoring transmissions from a serving node so that the access terminal may receive transmissions from a potential target node. In some cases the access terminal sends the unique identifier to the serving node which may then use the unique identifier to initiate handover operations. In some cases the access terminal uses the unique identifier to initiate handover operations.

The disclosure relates in some aspects to a serving node that sends an indication of an asynchronous time gap (e.g., a measurement gap or discontinuous transmission indication) to an access terminal served by that serving node. An asynchronous time gap may not commence and end at defined times. For example, an asynchronous time gap may commence once a message indicative of the time gap is received by an access terminal. Also, an asynchronous time gap may end once the access terminal receives a unique identifier from a target node. Thus, an asynchronous time gap also may not have a defined duration.

In some implementations a signal threshold may be assigned to a set of identifiers that have been identified as possibly being assigned to nodes that are subject to confusion. This threshold may then be used to trigger acquisition of a unique identifier by an access terminal and/or trigger a confusion determination operation at a serving node. For example, if an access terminal detects a signal from an access point assigned one of these identifiers and if the detected signal exceeds the threshold, the access terminal may autonomously acquire the unique identifier of the access point or the access terminal may report the reception of the signal to its serving access point. In the latter case, the serving access point may then determine whether the access terminal should attempt to acquire the unique identifier.

The disclosure relates in some aspects to an access terminal that commences handover operations at a target node after determining whether the access terminal is allowed to access the target node. For example, after acquiring a unique identifier of a target node, the access terminal may determine whether it is allowed to access the target node (e.g., through the use of an allowed list). If access is allowed, the access terminal may initiate a forward handover at the target node.

The disclosure relates in some aspects to a serving node that prepares several target nodes for potential handover if there is node identifier confusion. For example, after receiving an indication that an access terminal has detected a signal from a target node assigned a given identifier, the serving node may determine whether confusion exists or is likely. To this end, the serving node identifies a plurality of potential target nodes that are assigned this same identifier. The serving node may then prepare some or all of these potential target nodes for potential handover of the access terminal.

In some implementations the serving node may send information relating to the preparation of the potential target nodes to the access terminal. The access terminal may then determine whether a target node heard by the access terminal is one of the prepared target nodes. If so, the access terminal uses the corresponding handover preparation information it received from the source node to complete the handover to that target node.

BRIEF DESCRIPTION OF THE DRAWINGS

These and other sample aspects of the disclosure will be described in the detailed description and the appended claims that follow, and in the accompanying drawings, wherein:

Figure 1:
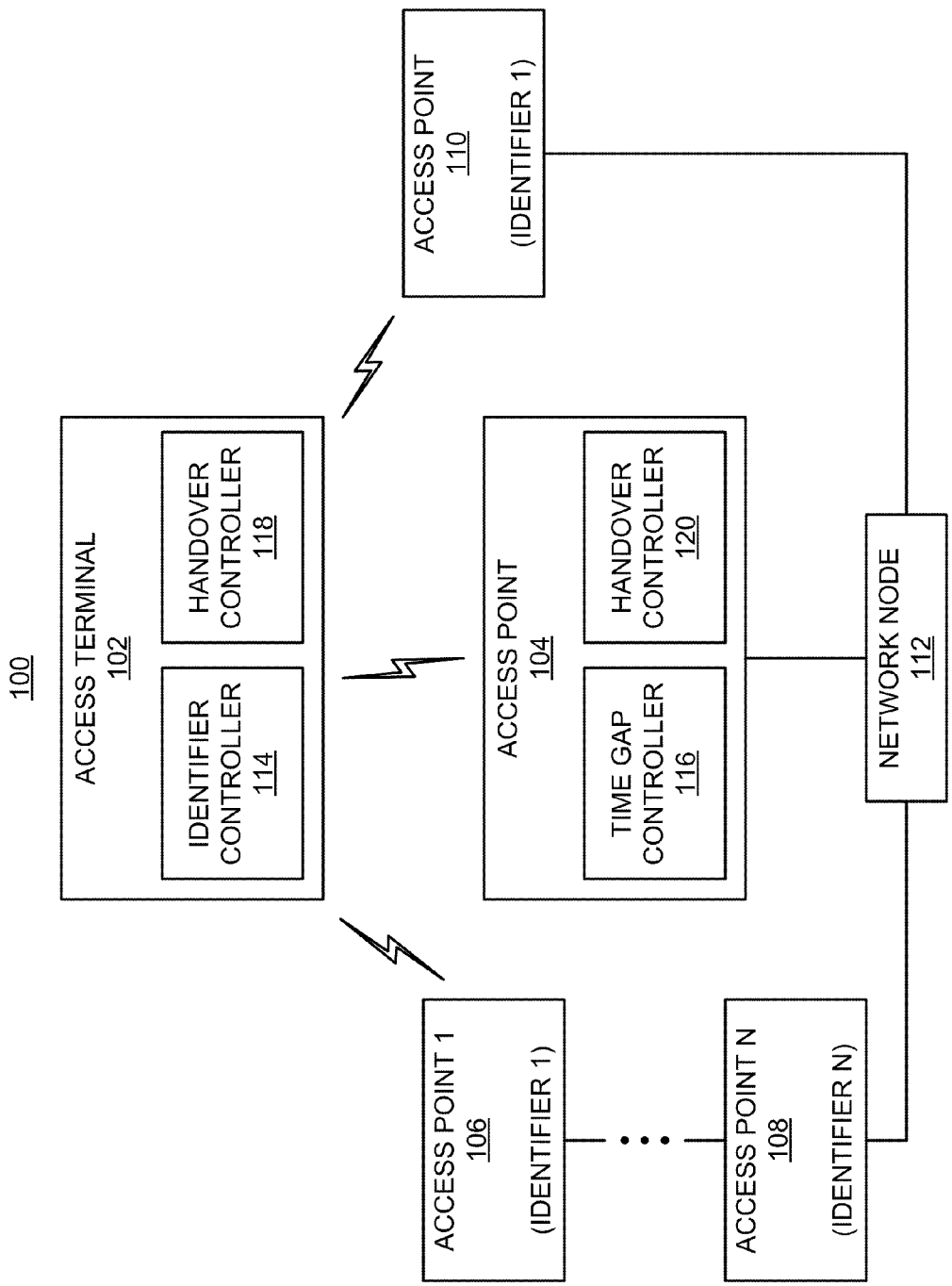
FIG. 1 is a simplified block diagram of several sample aspects of a communication system configured to resolve confusion.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes in a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations or eNodeBs, access terminals may be referred to or implemented as user equipment or mobiles, and so on.

Access points in the system 100 provide one or more services (e.g., network connectivity) for one or more wireless terminals (e.g., access terminal 102) that may be installed within or that may roam throughout an associated geographical area. For example, at various points in time the access terminal 102 may connect to an access point 104, any one of a set of access points 1-N (represented by access points 106 and 108 and the associated ellipsis), or an access point 110. Each of the access points 104-110 may communicate with one or more network nodes (represented, for convenience, by network node 112) to facilitate wide area network connectivity. Such network nodes may take various forms such as, for example, one or more radio and/or core network entities (e.g., a configuration manager, a mobility management entity, or some other suitable network entity).

Each access point in the system 100 may be assigned a first type of identifier, referred to herein as a node identifier. In various implementations such an identifier may comprise, for example, a physical cell identifier ("PCID"), a pseudo-random number ("PN") offset, or an acquisition pilot. Typically, a fixed quantity (e.g., 504) of node identifiers is defined in a given system. In such a case, identifier confusion may often arise when a large number of access points are in the same vicinity since several access points may end up using the same identifier.

FIG. 1 illustrates a simple example where the access point 106 and the access point 110 are both assigned "identifier 1." As the access terminal 102 roams through the system 100, the access terminal 102 may be handed over from a source access point (i.e., the serving access point to which the access terminal is currently connected, e.g., access point 104) to a target access point (e.g., access point 110). A decision to hand over the access terminal 102 to a target access point may be based on whether the access terminal 102 is receiving particularly strong signals (e.g., pilot signals) from that target.

In the example of FIG. 1, the access terminal 102 (e.g., an identifier controller 114) identifies signals from potential target access points by way of node identifiers associated with (e.g., embedded within) those signals. Upon receiving a signal from a potential target, the access terminal 102 may send a message (e.g., a measurement report) including the identifier to its current serving access point. If a decision is made to perform a handover, the serving access point (i.e., the source access point for the handover) may communicate with the target access point to reserve resources for the access terminal. For example, context information maintained by the serving access point may be transferred to the target access point and/or context information maintained by the target access point may be sent to the access terminal 102. In the absence of confusion, the node identifier ("identifier 1") associated with the target access point may be mapped to a unique identifier associated with the target access point, whereby the unique identifier is used to establish communication with the target access point. When confusion does exist as in the example of FIG. 1, however, the source access point may not be able to determine which access point is the desired target access point (e.g., the access point 104 may not be able to determine whether to communicate with the access point 106 or the access point 110 to reserve resources for the access terminal).

In accordance with one aspect of the disclosure, to resolve confusion such as this, the access terminal 102 (e.g., identifier controller 114) may be configured to acquire a second type of identifier associated with a potential target. In some aspects, the second type of identifier may comprise a unique identifier that is broadcast by the potential target. For example, the second type of identifier may be unique within a larger region than the first type of identifier. In some implementations the second type of identifier may be unique throughout an operator's network. In some implementations the second type of identifier may simply be more unique than the other node identifier (e.g., PCID). For example, the second type of identifier may have more bits than the other node identifier (e.g., 16 bits versus 10 bits). In this way, the likelihood of identifier confusion may be reduced (e.g., from 10 targets to 2 targets). Thus, in this case, the second type of identifier may not necessarily be fully unique within a network, globally, etc. In various implementations such a unique identifier may comprise, for example, a global cell identifier ("GCI"), an access node identifier ("ANID"), a sector identifier, an Internet Protocol address, or some other identifier that uniquely identifies the access point 110 within a network. Through the use of an identifier such as this, the desired target access point for the handover operation may be uniquely identified.

The access terminal 102 may commence monitoring for a second identifier autonomously or in response to a message from a serving access point. For example, in some cases the access terminal 102 may commence acquisition of the second identifier based on the signal strength of the first identifier. In some cases, upon receiving a measurement report with a confusing identifier from the access terminal 102, the access point 104 may instruct the access terminal 102 to acquire the second identifier.

In some cases, upon receiving a measurement report with a confusing identifier, the access point 104 (e.g., a time gap controller 116) may send a message including an indication of a time gap. During this time gap the access terminal 102 may temporarily cease monitoring transmissions from the access point 104 to thereby enable the access terminal 102 to acquire the second identifier of the target access point. As discussed in more detail below, in some aspects this time gap may comprise an asynchronous time gap that that does not have a synchronized starting time (e.g., synchronized to a system clock).

In accordance with one aspect of the disclosure, an access terminal may initiate connection re-establishment at a target access point if the access terminal determines that it may access the target access point. In some cases accessibility may be determined by comparing an identifier acquired from the target access point with a list that identifies the access points that allow access by the access terminal. For example, the access terminal 102 may maintain a list of the closed subscriber groups (corresponding to sets of one or more member access points) that will allow access by the access terminal. Accordingly, upon acquiring a closed subscriber group identifier ("CSG ID") of a potential target access point, the access terminal 102 (e.g., a handover controller 118) may use the allowed CSG list to determine whether the access terminal 102 is allowed to access that target access point. If so, the access terminal 102 may perform a random access at the potential target to initiate connection re-establishment. Thus, in accordance with this aspect of the disclosure, an access terminal may initiate connection re-establishment based on whether the access terminal is allowed access as opposed to conventional re-establishment that is initiated as a result of radio link failure.

In accordance with one aspect of the disclosure, an access point may prepare multiple potential targets for handover in the event confusion exists. For example, upon receiving a measurement report with a confusing identifier, the access point 104 (e.g., a handover controller 120) may identify a set of likely target candidates (e.g., a set of access points that use that same identifier). The access point 104 may then prepare each of those access points for a handover of the access terminal 102.

In accordance with one aspect of the disclosure, an access point may send handover preparation information for the set of prepared targets to the access terminal to be handed over. For example, upon receiving handover preparation information from the access point 104 (e.g., handover controller 120), the access terminal 102 (e.g., handover controller 118) may determine whether the target access point identified by the second identifier acquired by the access terminal 102 has been prepared for handover by the access point 104. If so, the access terminal 102 may perform a random access at the potential target to complete the handover.

Figure 2:
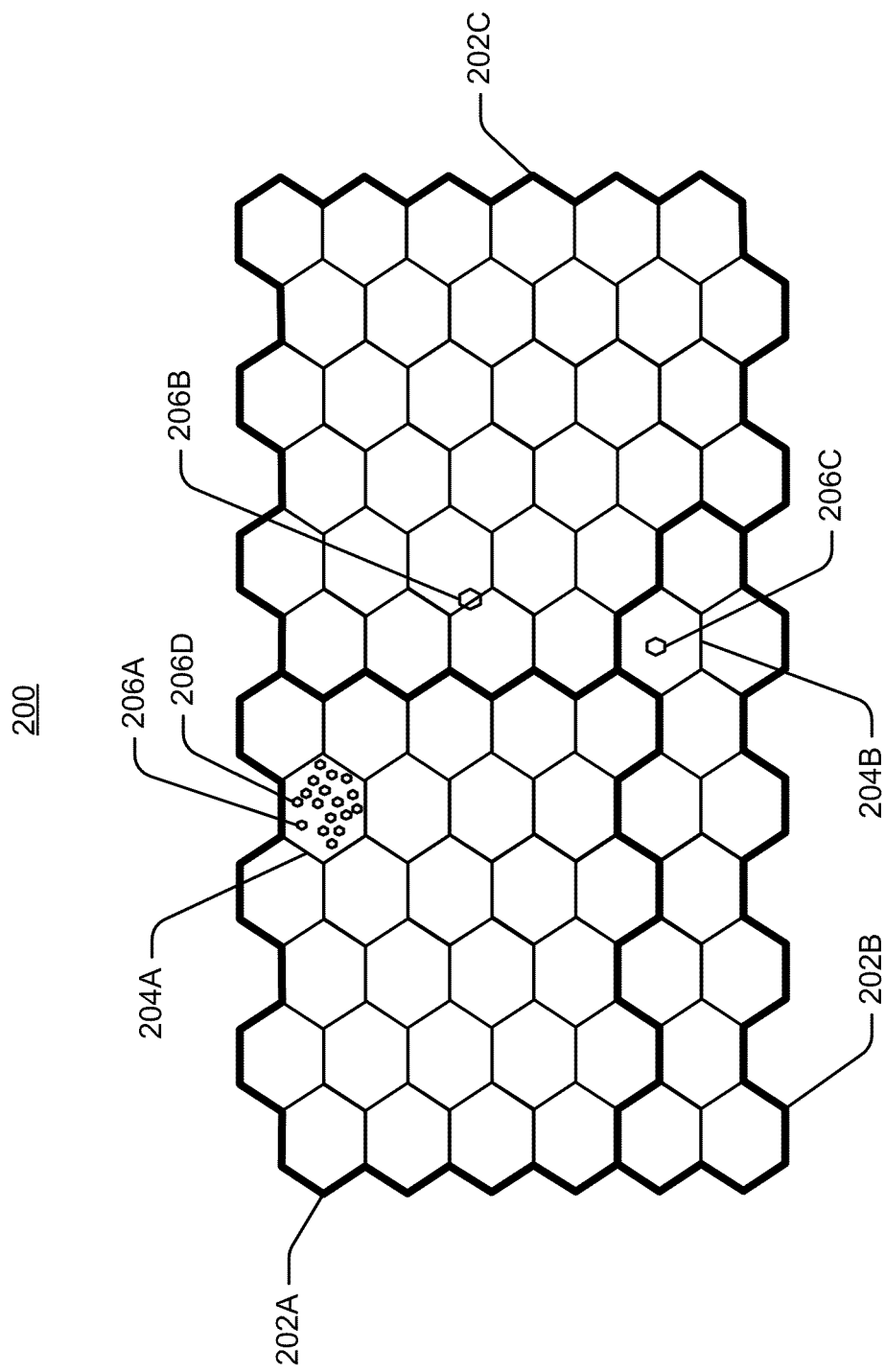
FIG. 2 is a simplified diagram illustrating coverage areas for wireless communication.

Identifier confusion typically may occur in a network where some access points provide macro coverage and other access points provide smaller coverage. For example, in a network 200 as shown in FIG. 2, macro coverage areas 204 (e.g., areas 204A and 204B) may be provided by macro access points of a large area cellular network such as a 3G network, typically referred to as a macro cell network or a wide area network ("WAN"). In addition, smaller coverage areas 206 (e.g., areas 206A and 206B) may be provided by, for example, access points of a residence-based or building-based network environment, typically referred to as a local area network ("LAN"). As an access terminal moves through such a network, the access terminal may be served in certain locations by access points that provide macro coverage while the access terminal may be served at other locations by access points that provide smaller area coverage. In some aspects, the smaller area coverage access points may be used to provide incremental capacity growth, in-building coverage, and different services, all leading to a more robust user experience.

In the description herein, a node (e.g., an access point) that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage (e.g., coverage within a commercial building) over an area that is smaller than a macro area and larger than a femto area. In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively.

In the example of FIG. 2, several tracking areas 202 (or routing areas or location areas) are defined, each of which includes several macro coverage areas 204. Here, areas of coverage associated with tracking areas 202A, 202B, and 202C are delineated by the wide lines and the macro coverage areas 204 are represented by the larger hexagons. As mentioned above, the tracking areas 202 also may include femto coverage areas 206. In this example, each of the femto coverage areas 206 (e.g., femto coverage area 206C) is depicted within one or more macro coverage areas 204 (e.g., macro coverage area 204B). It should be appreciated, however, that some or all of a femto coverage area 206 may not lie within a macro coverage area 204. Also, one or more pico coverage areas (not shown) may be defined within a given tracking area 202 or macro coverage area 204.

In a deployment (e.g., a dense urban deployment) where a large number of access points such as femto and pico nodes are located within a given area, two or more of these access points may be assigned the same node identifier. For example, in the macro coverage area 204A, the femto coverage areas 206A and 206D may be assigned the same identifier. In such a case, node identifier confusion (e.g., PCID confusion) may occur since multiple neighboring nodes that are in the vicinity of the serving access point of an access terminal advertise the same node identifier. For example, in FIG. 1 the access points 106 and 110 may comprise femto nodes or pico nodes that advertise "identifier 1" via respective broadcast pilot signals. Moreover, both of these access points may be near the access point 104 (e.g., a macro access point) that is currently serving the access terminal 102. In such a case, the access point 104 may be aware of both access points 106 and 110 and, hence, confusion may arise when a handover to the access point identified by "identifier 1" is indicated.

In general, the confusion resolution techniques described herein may be applicable to any type of node. In many deployments, however, the macro access points in a given area will be planned such that there will not be confusion associated with a handover to a macro access point. In such cases, the confusion resolution techniques taught herein may be applicable to any non-macro nodes in the network. Such non-macro nodes may include, for example, nodes that are deployed in an unplanned manner. As noted above, such non-macro nodes may include femto nodes (e.g., deployed by individuals) as well as operator-deployed, low-power pico nodes. Also, as will be discussed in more detail below, a node may be restricted in some manner (e.g., restricted for access). Hence, the confusion resolution techniques taught herein may be applicable to restricted nodes (e.g., nodes associated with a closed subscriber group).

With the above overview in mind, various techniques that may be employed to resolve confusion in accordance with the teachings herein will be described with reference to FIGS. 3-8C. Briefly, FIG. 3 illustrates several sample components that may be employed in an access point or access terminal and the flowcharts of FIGS. 4A-8C relates to various techniques for resolving confusion.

Figure 3:
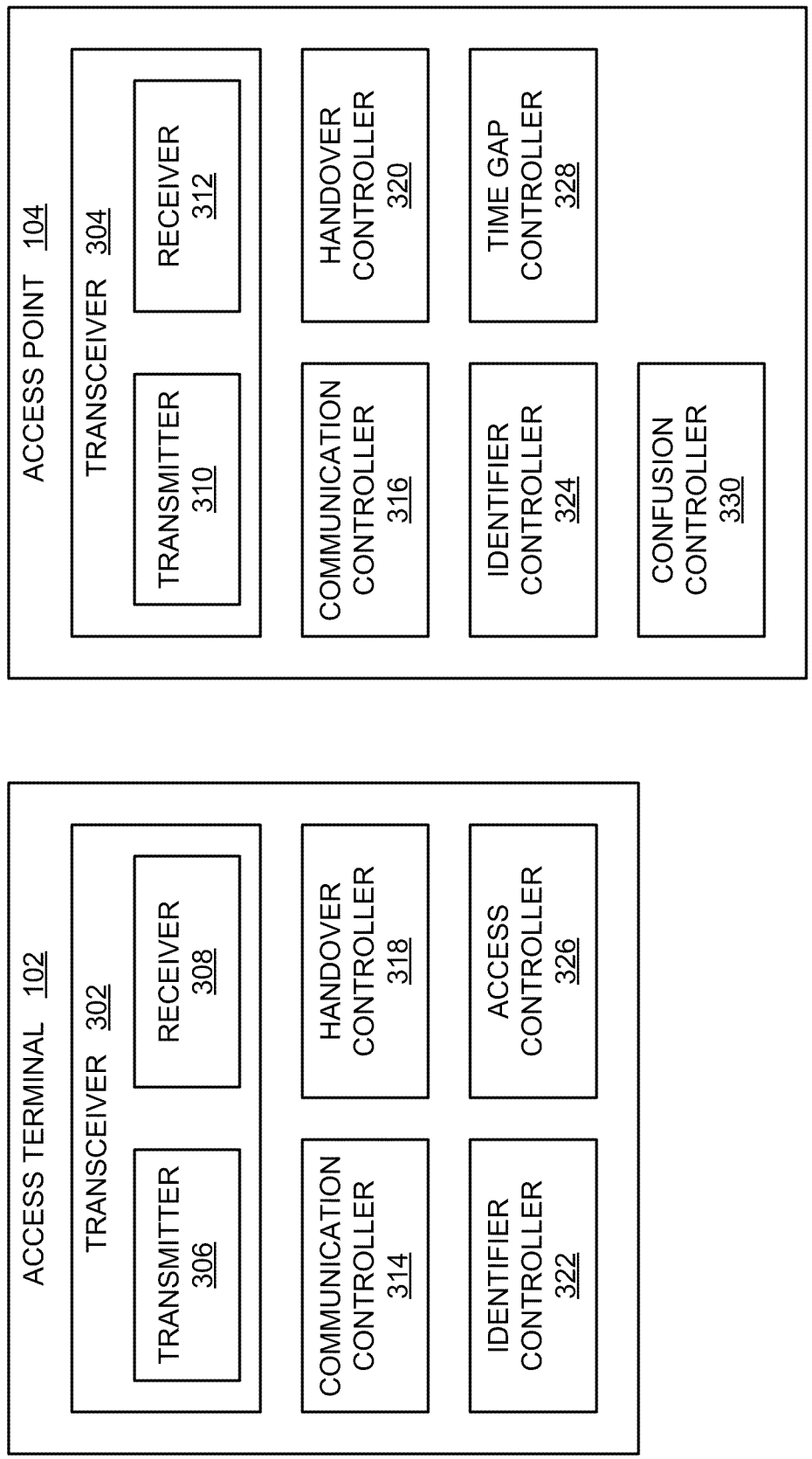
FIG. 3 is a simplified block diagram of several sample aspects of components that may be employed in communication nodes.

For illustration purposes, the operations of FIGS. 4A-8C (or any other operations discussed or taught herein) may be described as being performed by specific components (e.g., components of the system 100 and/or the components shown in FIG. 3). It should be appreciated, however, that these operations may be performed by other types of components and may be performed using a different number of components. It also should be appreciated that one or more of the operations described herein may not be employed in a given implementation.

FIG. 3 illustrates several sample components that may be incorporated into nodes such as the access terminal 102 and the access point 104 to perform confusion resolution operations as taught herein. The described components also may be incorporated into other nodes in a communication system. For example, other nodes in a system may include components similar to those described for the access terminal 102 and the access point 104 to provide similar functionality. A given node may contain one or more of the described components. For example, an access terminal may contain multiple transceiver components that enable the access terminal to operate on multiple frequencies and/or communicate via different technology.

As shown in FIG. 3, the access terminal 102 and the access point 104 may include transceivers 302 and 304, respectively, for communicating with other nodes. The transceiver 302 includes a transmitter 306 for sending signals (e.g., messages) and a receiver 308 for receiving signals (e.g., including conducting searches for pilot signals). Similarly, the transceiver 304 includes a transmitter 310 for sending signals and a receiver 312 for receiving signals.

The access terminal 102 and the access point 104 also include other components that may be used in conjunction with confusion resolution operations as taught herein. For example, the access terminal 102 and the access point 104 may include communication controllers 314 and 316, respectively, for managing communication with other nodes (e.g., sending and receiving messages/indications) and for providing other related functionality as taught herein. In addition, the access terminal 102 and the access point 104 may include handover controllers 318 and 320 (e.g., corresponding to handover controllers 118 and 120 in FIG. 1), respectively, for performing handover-related operations and for providing other related functionality as taught herein. The access terminal 102 and the access point 104 may include identifier controllers 322 (e.g., corresponding to identifier controller 114) and 324, respectively, for managing (e.g., selecting, acquiring, requesting, and so on) node identifiers and for providing other related functionality as taught herein. The access terminal 102 may include an access controller 326 for determining whether the access terminal 102 is allowed to access a node and for providing other related functionality as taught herein. The access point 104 may include a time gap controller 328 (e.g., corresponding to time gap controller 116) for providing a time gap indication for the access terminal 102 (e.g., sending an indication of the time gap in a message) and for providing other related functionality as taught herein. The access point 104 may include a confusion controller 330 for performing confusion-related operations and for providing other related functionality as taught herein. For example, the confusion controller 330 may autonomously detect actual or potential confusion or, upon receipt of an indication of confusion from the access terminal 102, the confusion controller 320 may take further steps to determine whether there is confusion or may simply attempt to resolve the confusion. In any of these cases, once confusion is detected, the confusion controller 320 may perform or initiate various operations to resolve the confusion (e.g., request the access terminal 102 to acquire the unique identifier, provide a time gap, identify and prepare targets, and so on). Other sample operations of the components of FIG. 3 are described below.

For convenience the access terminal 102 and the access point 104 are shown in FIG. 3 as including components that may be used in the various examples described below in conjunction with FIGS. 4A-8C. In practice, one or more of the illustrated components may not be used in a given example. As an example, in some implementations the access terminal 102 may not comprise the handover controller 318 and in some implementation the access point 104 may not include the time gap controller 328.

Figure 4A:
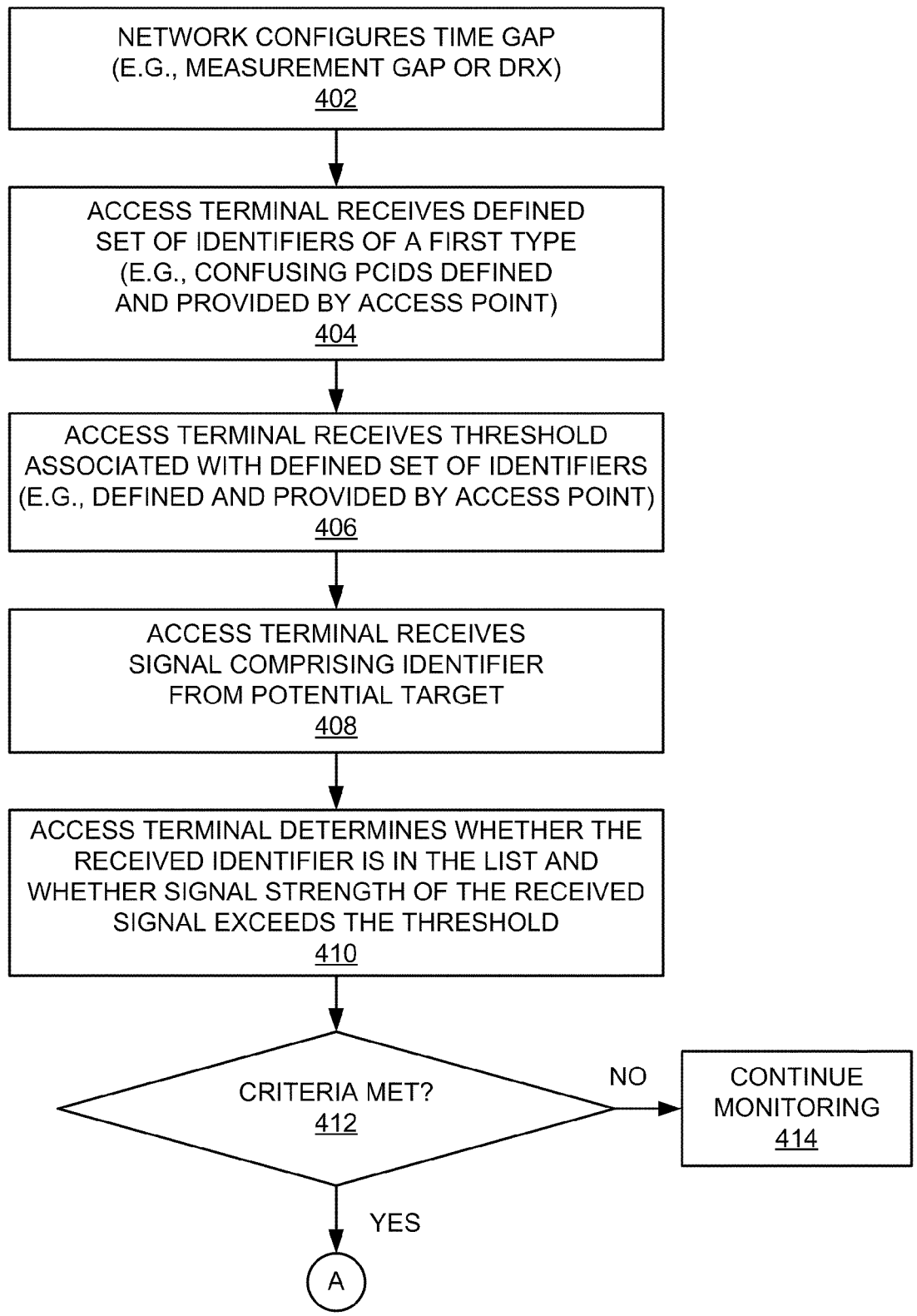
FIGS. 4A and 4B are a flowchart of several sample aspects of operations that may be performed to enable an access terminal to acquire a second type of identifier.
Figure 4B:
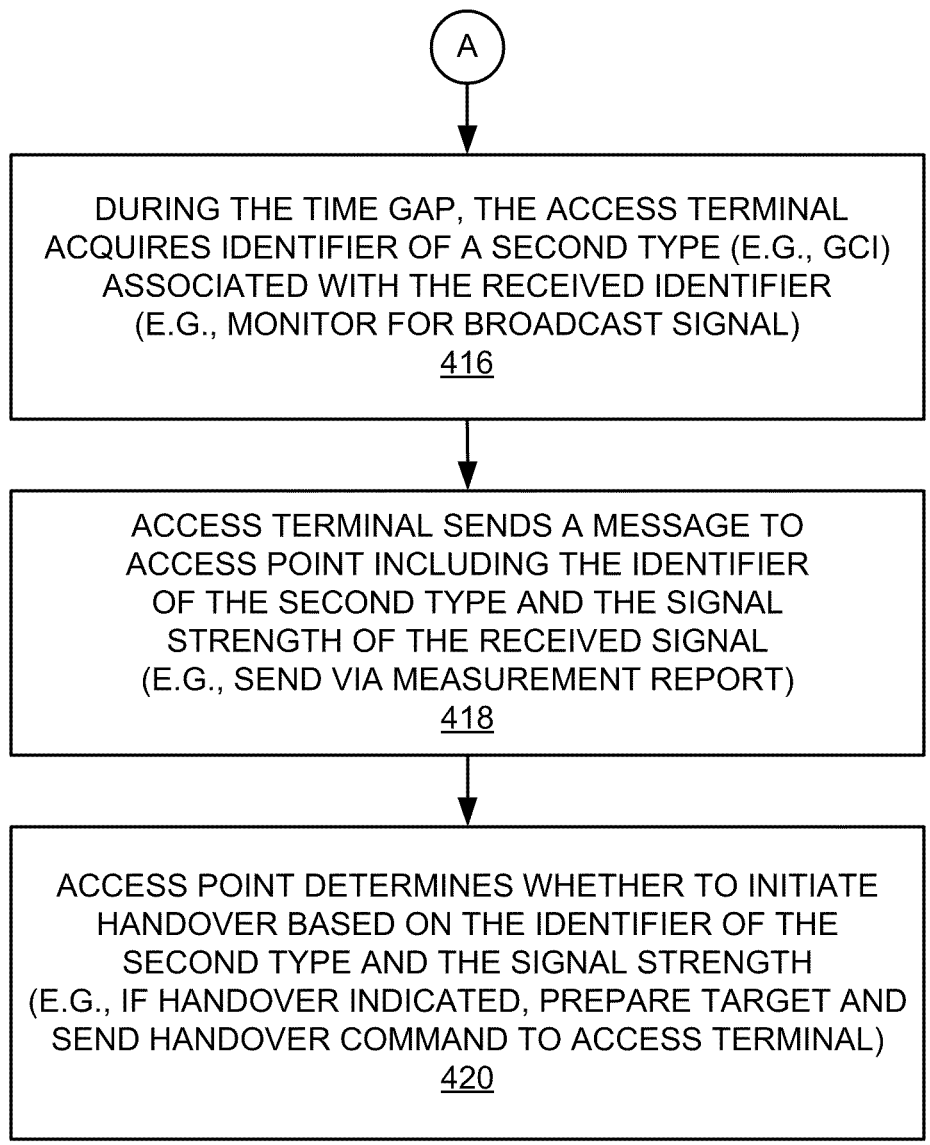

FIGS. 4A and 4B describe a scheme where an access terminal uses a network configured time gap to acquire a second identifier (e.g., a unique identifier such as a GCI) of a potential target. This scheme will be described in the context of a confusion resolution process where an access terminal autonomously determines whether to acquire the second identifier. For example, the access terminal may compare the signal strength of a signal associated with a first identifier of the node with a threshold to determine whether to acquire the second identifier. Thus, the access terminal may acquire the second identifier without being requested to do so by another node (e.g., a serving access point).

As represented by block 402, at some point in time the network (e.g., a network node 120 such as an MME or a serving access point) may configure a time gap for the access terminal. For example, in some cases the network may configure a synchronous measurement gap that defines specific a starting time for a measurement gap, a duration of the measurement gap, and a periodicity of the measurement gap. The network may then send an indication of the defined measurement gap to the access terminal. In some cases a time gap may be provided by indicating that discontinuous reception ("DRX") is to be employed.

Referring now to block 404, in some implementations a set of the identifiers from the node identifier space (e.g., PCID space) may be reserved for non-macro nodes to simplify confusion resolution. Through the use of such a defined identifier set, a node that receives a signal including an identifier from the set may readily determine that identifier confusion is possible or likely. For example, it may be assumed or determined that certain femto nodes will likely be subject to confusion. Thus, these femto nodes may be assigned identifiers from the set so that any node that receives the identifier broadcast by one of these femto nodes may readily determine that the second identifier should be acquired to ensure that confusion does not occur. In some implementations the set comprises a set of designated values that is associated with access points that are designated as not being confusion-free. In some implementations the set comprises a set of designated values that is associated with a closed subscriber group (e.g., as discussed below). In some implementations the set comprises a set of designated values that is associated with access points of at least one designated type (e.g., a node type). Such a designated type may relate to, for example, one or more of: transmit power, coverage area, or relay capabilities.

Accordingly, at block 404 an access terminal may receive a defined set of identifiers of a first type. This list may comprise, for example, the set of node identifiers discussed above. In some implementations this list may be received from a serving access point (e.g., the identifier controller 324 of access point 104). For example, the serving access point may identify all of the PCIDs that are or may be subject to confusion, and supply a list of these identifiers to the access terminal. In some implementations the set may be received from a configuration manager (e.g., network node 112) that keeps track of the reserved set of nodes that are assigned an identifier from the list. In some implementations the set may be generated based on information received from nodes in the system. For example, a target access point or some other access points may advertise an indication (e.g., via neighbor list information) that a second type of identifier (e.g., a GCI) must be used when accessing the target access point.

As represented by block 406, the access terminal may receive a threshold associated with the defined set of identifiers. For example, this threshold may designate the threshold signal strength value for a received signal that triggers acquisition of the second type of identifier by the access terminal. This threshold may be defined by and/or provided by a serving access point or some other node. In some implementations this threshold may be defined to be lower (e.g., by a few dB) than the received signal strength threshold that triggers a handover operation. In some implementations the threshold may be specified as a relative offset from a target access point signal strength, or as an absolute threshold for the carrier-to-interference ("C/I") value from a target access point. In some cases, such a threshold may be defined to be equal to the signal strength of a signal from the current serving access point plus an offset.

As represented by block 408, at some point in time the access terminal will receive a signal that is associated with (e.g., comprises) an identifier of the first type. For example, this signal may be acquired when an access terminal that is connected to a macro access point activates a search for nearby femto nodes (e.g., a home eNodeB). When the access terminal detects a signal from a femto node, the access terminal may obtain an identifier of the first type (e.g., PCID, PN offset, Pilot ID, sector ID, etc.) from the signal.

As represented by block 410, the access terminal may then determine whether the received identifier is in the list of identifiers obtained at block 404. In addition, the access terminal may determine whether the received signal strength of the signal received at block 410 is greater than equal to the threshold obtained at block 406.

As represented by blocks 412 and 414, if the criteria of block 410 are not met, the access terminal may continue monitoring for signals from neighboring access points.

As represented by block 416 of FIG. 4B, if the criteria of block 410 are met, the access terminal (e.g., identifier controller 322) acquires an identifier the second type (e.g., GCI) that is associated with the identifier received at block 408. Here, acquiring the second identifier may comprise monitoring for other signals from the target access point that contain the second identifier. As an example, the target access point may broadcast system information including the second identifier at intervals that are less frequent than the intervals at which the target access point broadcasts a first identifier (e.g., PCID).

In some aspects, the access terminal acquires the second identifier through the use of the time gap configured by the network (e.g., by monitoring for signals from the target access point during the next available time gap). For example, in some implementations a GCI is sent once every 20 ms on via a System Information Block (e.g., SIB1). In addition, in some implementations each measurement gap is shorter than 20 ms (e.g., 6 ms). Thus, in some cases, the first measurement gap instance may not overlap with SIB1. By making the period of the measurement periodicity a non-multiple of 20 ms, it is possible for subsequent measurement gaps to coincide with a SIB transmission of a target. Accordingly, it is desirable for the network to configure the periodicity of the measurement gap appropriately (e.g., 86 ms) to enable an access terminal to effectively acquire the second identifier.

As represented by block 418, the access terminal (e.g., identifier controller 322) sends a message to the source access point including the identifiers acquired at blocks 408 and 416 and the received signal strength of an associated signal (e.g., the signal received at block 416). This message may be sent just after the second identifier is acquired at block 416 or at some other time. In some implementations this information is sent in a measurement report. For example, this report may be sent once the received signal strength of a received signal (e.g., a pilot from a target access point) exceeds a handover threshold.

As represented by block 420, as any potential confusion associated with the first identifier acquired at block 408 is resolved as a result of the acquisition of the second identifier, the access point (e.g., the handover controller 320) determines whether to initiate a handover operation based on the second identifier and the received signal strength provided in this message. If a handover operation is indicated, the access point will use the second identifier to prepare the target access point (e.g., by sending a handover preparation message). In addition, the access point sends a handover command (e.g., RRC reconfiguration message) to the access terminal. The access terminal may then communicate with the target and complete the handover (RRC reconfiguration complete).

In some aspects the scheme of FIGS. 4A and 4B may prove advantageous in high mobility environments. For example, this scheme may provide relatively fast handover because the GCI may be read before the signal strength of the target access point is strong enough for handover to be required. Moreover, the number of measurements reports generated by the access terminal in the system may be reduced as compared to other techniques since a measurement report may only be sent out after the corresponding reporting threshold (e.g., RRC reporting threshold) is crossed.

As mentioned above, some of the operations described herein may not be employed in every implementation. For example, in some implementations the set of identifiers (e.g., the range of confusing PCIDs) may not be provided to the access terminal at block 404. In such cases, the access terminal may report all of the identifiers of the first type that it hears. This reporting may still be constrained by a threshold (e.g., only those signals that exceed the threshold are reported) in some cases.

Figure 5A:
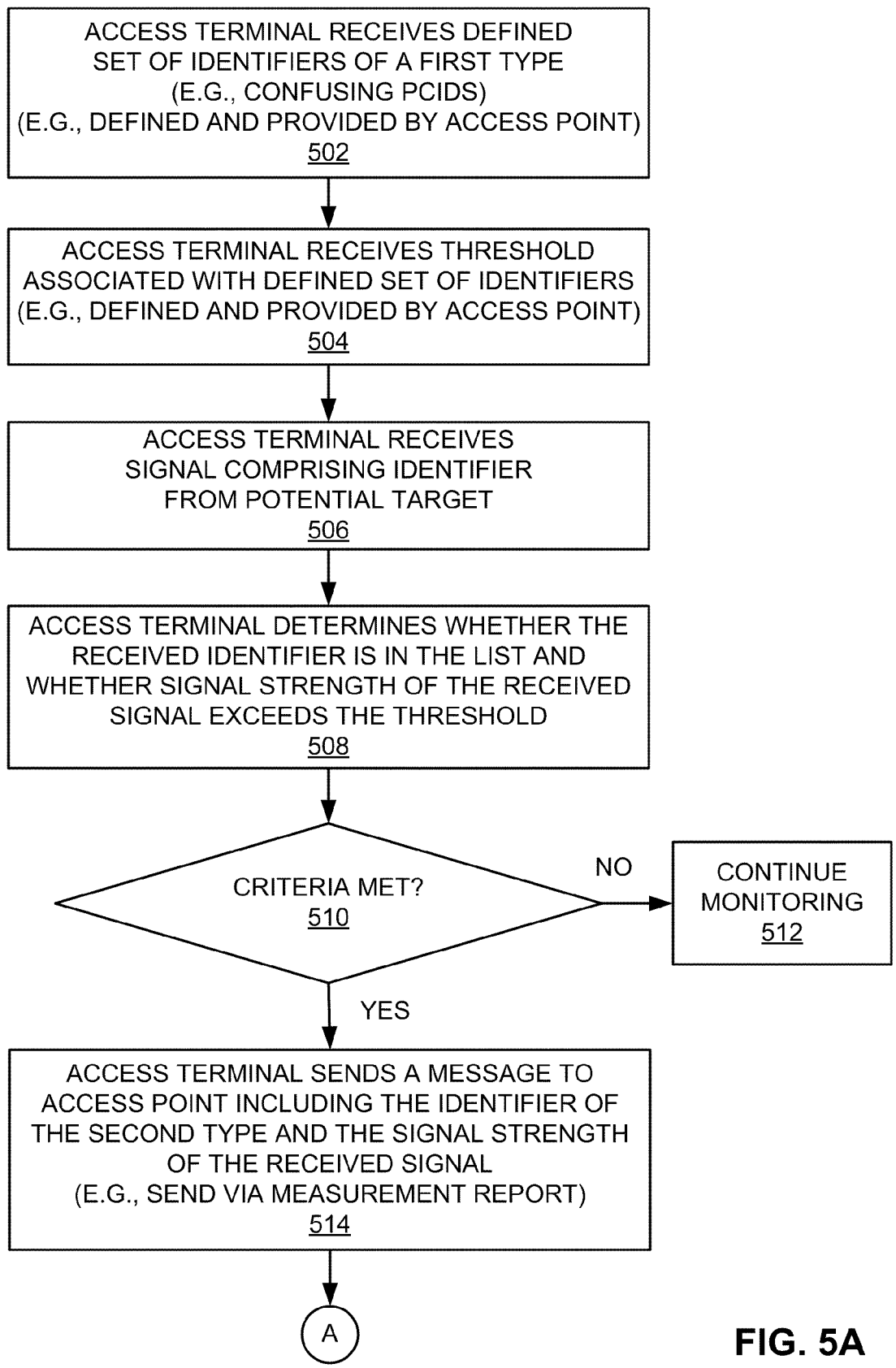
FIGS. 5A, 5B, and 5C are a flowchart of several sample aspects of operations that may be performed to enable an access terminal to acquire a second type of identifier.
Figure 5B:
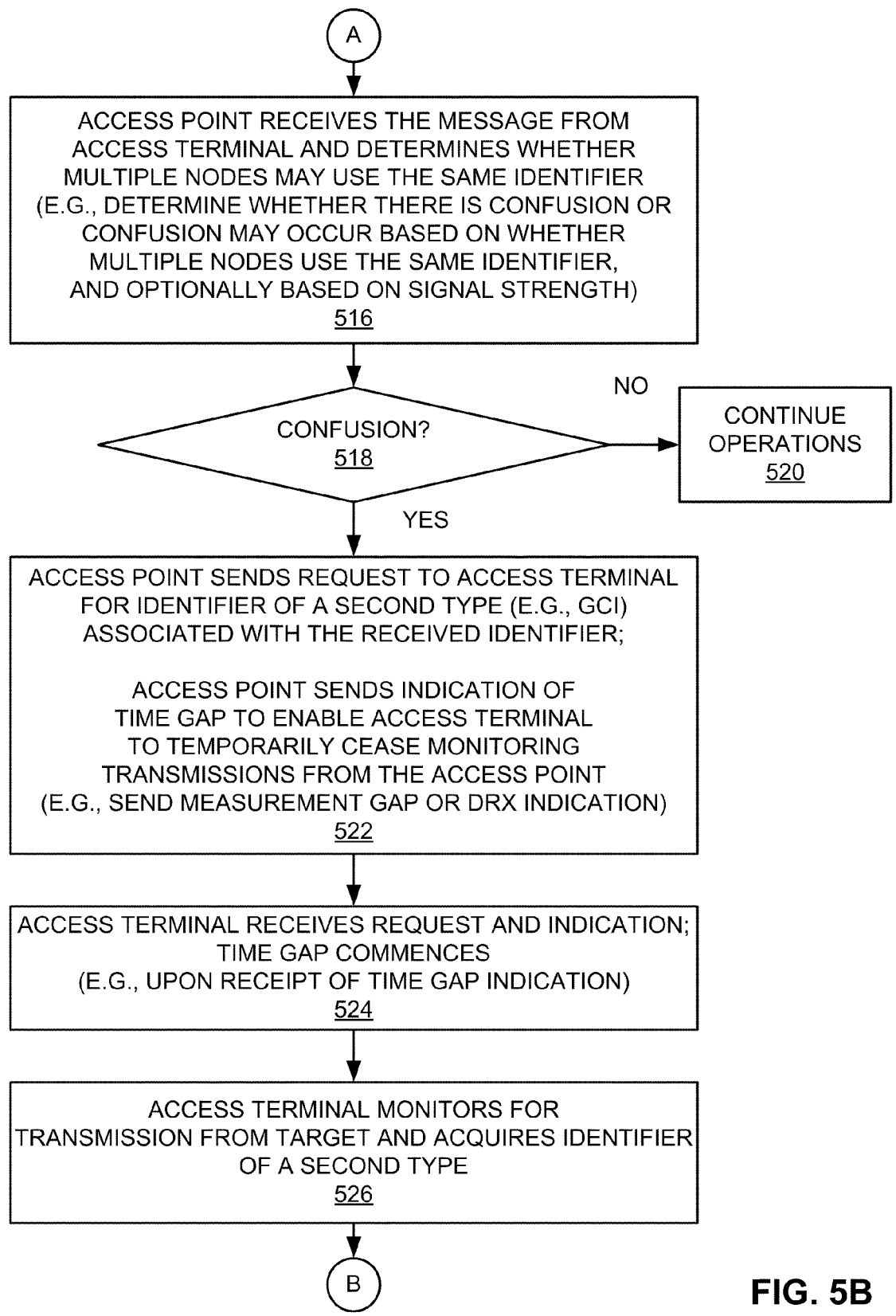
Figure 5C:
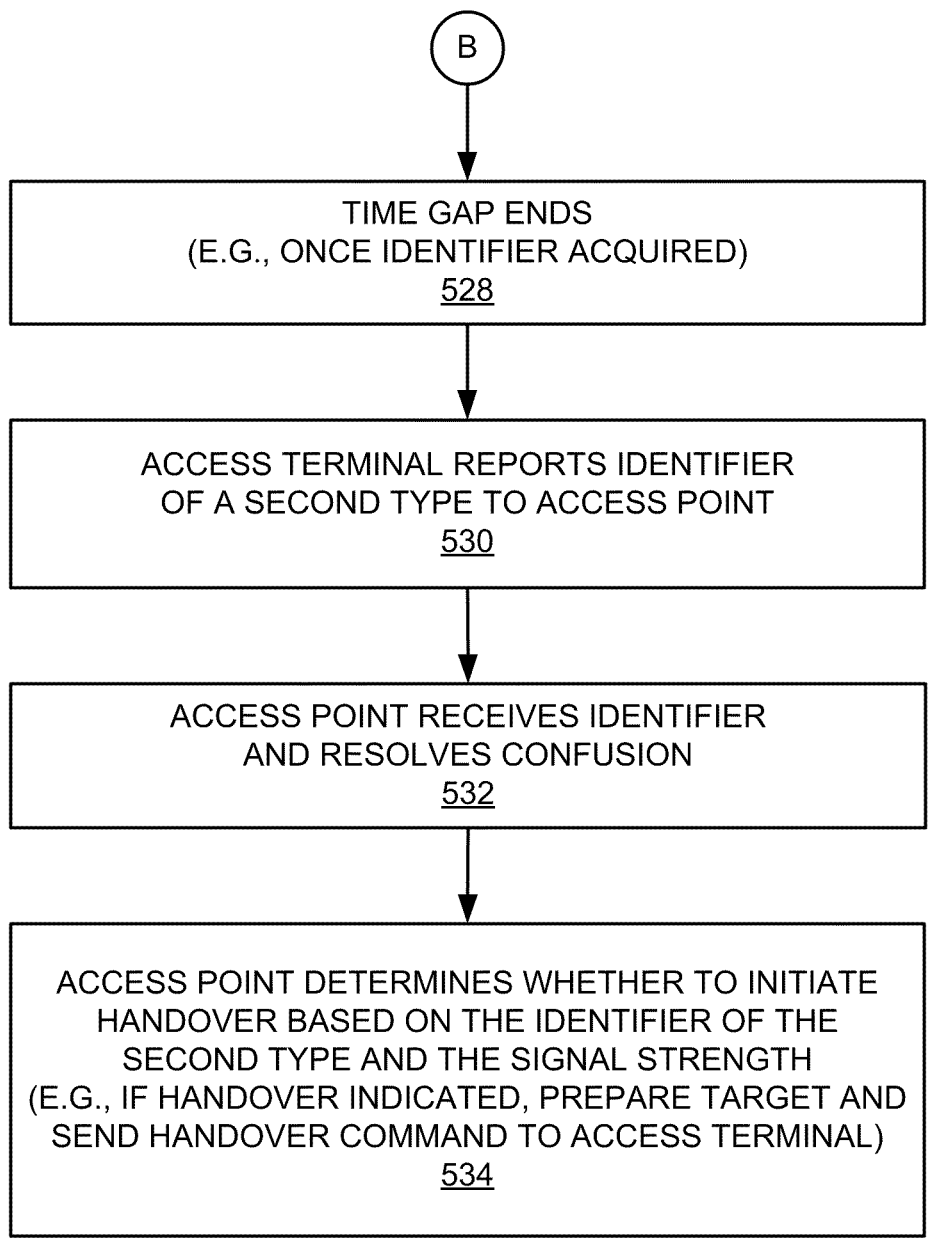

FIGS. 5A-5C describe a scheme where an access terminal uses and asynchronous time gap to acquire a second identifier (e.g., a unique identifier such as a GCI) of a potential target. This scheme will be described in the context of a confusion resolution process where an access terminal reports receipt of a signal that exceeds a threshold (e.g., a GCI resolution threshold) to an access point. The access point then determines whether confusion is occurring or likely and, if so, instructs the access terminal to acquire a second identifier (e.g., GCI). Here, the operations of blocks 502-512 may be similar to the operations of blocks 404-414 of FIG. 4, respectively. Accordingly, these operations will not be described again.

At block 514 of FIG. 5A, if the received identifier is in the list and the received signal strength exceeds the threshold (at block 510), the access terminal sends a message to the access point that includes the identifier acquired at block 506 and the received signal strength of the associated signal. This message may be sent just after the identifier is acquired at block 506 or at some other time. In some implementations this information is sent in a measurement report.

The access point (e.g., identifier controller 324) receives the message from the access terminal as represented by block 516 of FIG. 5B. The access terminal (e.g., confusion controller 330) then determines whether multiple nodes may use the same identifier (i.e., determine whether the received identifier may be used to identify at least one node other than the target access point). For example, this may be determined by comparing the identifier to a list that indicates which identifiers have been or may be assigned to different access points in a network (e.g., where the list is maintained at the access point or elsewhere), by determining whether the identifier belongs to a defined set of identifiers (e.g., a set of confusing identifiers provided at block 502), or determined in some other manner. Thus, the access point may provide identifier confusion detection based on the received information by determining whether there is confusion associated with the use of the received identifier (e.g., whether confusion is occurring or is likely). Here, confusion detection may be based on whether multiple nodes actually are using the same identifier or whether there is a possibility (e.g., a high likelihood) that multiple nodes will use the same identifier. In addition, the above determinations may optionally be based on the received signal strength of any detected signals associated with this identifier.

As represented by blocks 518 and 520, if confusion is not detected the access point may continue with standard operations. For example, the access point may determine whether handover is warranted and, if so, determine the second identifier for the target based on the first type of identifier received via the measurement report.

In contrast, as represented by block 522, the access point will send one or more messages to the access terminal if confusion is detected. For example, the access terminal may send a request for the access terminal to acquire the second identifier (e.g., CGI) associated with the received identifier. In addition, the access terminal (e.g., time gap controller 328) may send an asynchronous time gap indication to the access terminal to enable the access terminal to temporarily cease monitoring transmissions by the access terminal. This will allow the access terminal to more effectively monitor for transmissions from the target access point during the time gap to acquire the second identifier.

As mentioned above, an asynchronous time gap does not have synchronized timing. For example, in contrast with conventional measurement gaps, an asynchronous time gap does not have a defined periodicity (e.g., that begins at certain periodically occurring frame numbers). Thus, an asynchronous time gap may not have a defined starting time (e.g., that is synchronized to a system clock). As a specific example, in some cases an asynchronous time gap may be defined to commence when an indication of the time gap is received by the access terminal. In addition, an asynchronous time gap may not have a defined ending time (e.g., a specified time that is synchronized to a system clock). For example, in some cases an asynchronous time gap may be defined to end when the access terminal acquires the second identifier. Thus, with an asynchronous time gap, an access terminal may autonomously exit a network configured time gap. Accordingly, an asynchronous time gap may not have a defined duration. In some cases, however, a maximum limit may be defined (e.g., 4-5 seconds) after which the monitoring for the second identifier is terminated.

A time gap may be defined in various ways. In some implementations a time gap may be implemented as a measurement gap. In some implementations a time gap may be implemented using discontinuous reception.

The access point may send an indication of the time gap to the access terminal in various ways. In some cases the access point may send the indication in conjunction with (e.g., in the same MAC frame as) the request for the second identifier. In some cases, the access point sends an RRC reconfiguration message with a measurement gap or DRX configuration.

As represented by block 524, the access terminal (e.g., identifier controller 322) receives the request including the indication. In addition, the access terminal (e.g., a communication controller 314 that determines when to transmit and receive) receives the time gap indication. Advantageously, in this case, the next time gap for reading the second identifier may be available immediately upon receipt of the message. Thus, as represented by block 526, the access terminal (e.g., receiver 308) may immediately monitor for transmissions from the target access point to acquire the second identifier as discussed herein. The time gap may then terminate as represented by block 528 of FIG. 5C (e.g., once the second identifier is obtained). As represented by block 530, the access terminal (e.g., identifier controller 322) responds to the request of block 522 by sending a message (e.g., a measurement report) that includes the second identifier to the access point.

As represented by block 532, the access point receives the message, thereby enabling the access point to resolve the confusion. Here, receipt of the message by the access point may serve as an indication to the access point that the time gap has ended.

As represented by block 534, the access point (e.g., handover controller 320) may determine whether to initiate a handover based on the second identifier and the received signal strength (e.g., as discussed herein). If a handover is indicated, the access point will use the second identifier to prepare the target access point (e.g., by sending a handover preparation message). The access point sends a handover command to the access terminal and the access terminal communicates with the target to complete the handover.

One or more of the operations described above may not be employed in a given implementation. For example, in some implementations the set of identifiers (e.g., the range of confusing PCIDs) may not be provided to the access terminal at block 502. In such cases, the access terminal may report all of the identifiers of the first type that it hears. This reporting may still be constrained by a threshold in some cases.

In some implementations the threshold test also may be omitted. For example, the access terminal may instead simply report every identifier of the first type that it hears. Upon receiving these reports, the access point may determine whether confusion exists or is likely for each identifier (e.g., at block 516). If confusion is detected here, the access point may send a request for the second identifier to the access terminal along with a time gap indication (e.g., at block 522). The access terminal may then report back the second identifier and handover operations may commence as discussed above, if warranted.

FIGS. 6A-6D describe a scheme where an access terminal initiates connection re-establishment at a target if the access terminal determines that it is allowed to access the target. This scheme will be described in the context of a confusion resolution process where an access terminal reports a first identifier to an access point if the associated signal exceeds a threshold and acquires a second identifier (e.g., GCI) upon receiving an indication of an asynchronous time gap from the access point. It should be appreciated, however, that the disclosure of FIGS. 6A-6D may be applicable to other confusion resolution processes that do not include all of the operations described below. For example, the asynchronous time gap may not be employed in some implementations.

As represented by block 602, at some point in time the access terminal will receive a signal (e.g., a pilot) from a potential target and acquire a first identifier (e.g., PCID) associated with the potential target. Thus, the operations of block 602 may be similar to the operations of block 408 described above.

As represented by block 604, in some implementations the access terminal (e.g., access controller 326) may determine whether it is likely to be in the vicinity of a potential target access point (e.g., a cell of that access point) at which the access terminal is likely to be allowed access. The access terminal may use various techniques to determine whether it may be in the vicinity of such a potential target (e.g., a Home eNodeB). For example, in some cases the determination may be based on an autonomous search. In some cases the access terminal may use global positioning system techniques to determine its geographical location and correlate that location to the known location of the potential target or other nodes in the vicinity of the potential target. In some cases the access terminal may determine whether it is near a given access point based on signals (e.g., based on the phase delay of received signals) received from other nodes in the vicinity of the potential target.

Based on the above determination, the access terminal (e.g., access controller 326) may generate a corresponding indication (e.g., referred to as an allowed likelihood indication). For example, this indication may indicate the probability of whether the access terminal is near the potential target.

As represented by block 606, the access terminal (e.g., identifier controller 322) determines whether to report the receipt of the signal that was received at block 602. This determination may be based on one or more criteria.

In some cases the determination of block 606 is based on whether the signal strength of the received signal is greater than or equal to a threshold. For example, as discussed above at block 406, such a threshold may be defined to be equal to the signal strength of a signal from the current serving access point plus an offset.

In some cases the determination of block 606 is based on the allowed likelihood indication. For example, the access terminal may allow the receipt of the signal to be reported if the indication meets or exceeds a defined probability.

As represented by blocks 608 and 610, if the criteria of block 606 are not met, the access terminal may continue monitoring for signals from neighboring access points.

As represented by block 612, if the criteria of block 606 are met, the access terminal (e.g., identifier controller 322) sends a report message (e.g., a measurement report) to its serving access point. This report message may include the identifier acquired at block 602 and the received signal strength of the associated signal. In some implementations the report message also includes the allowed likelihood indication.

Figure 6A:
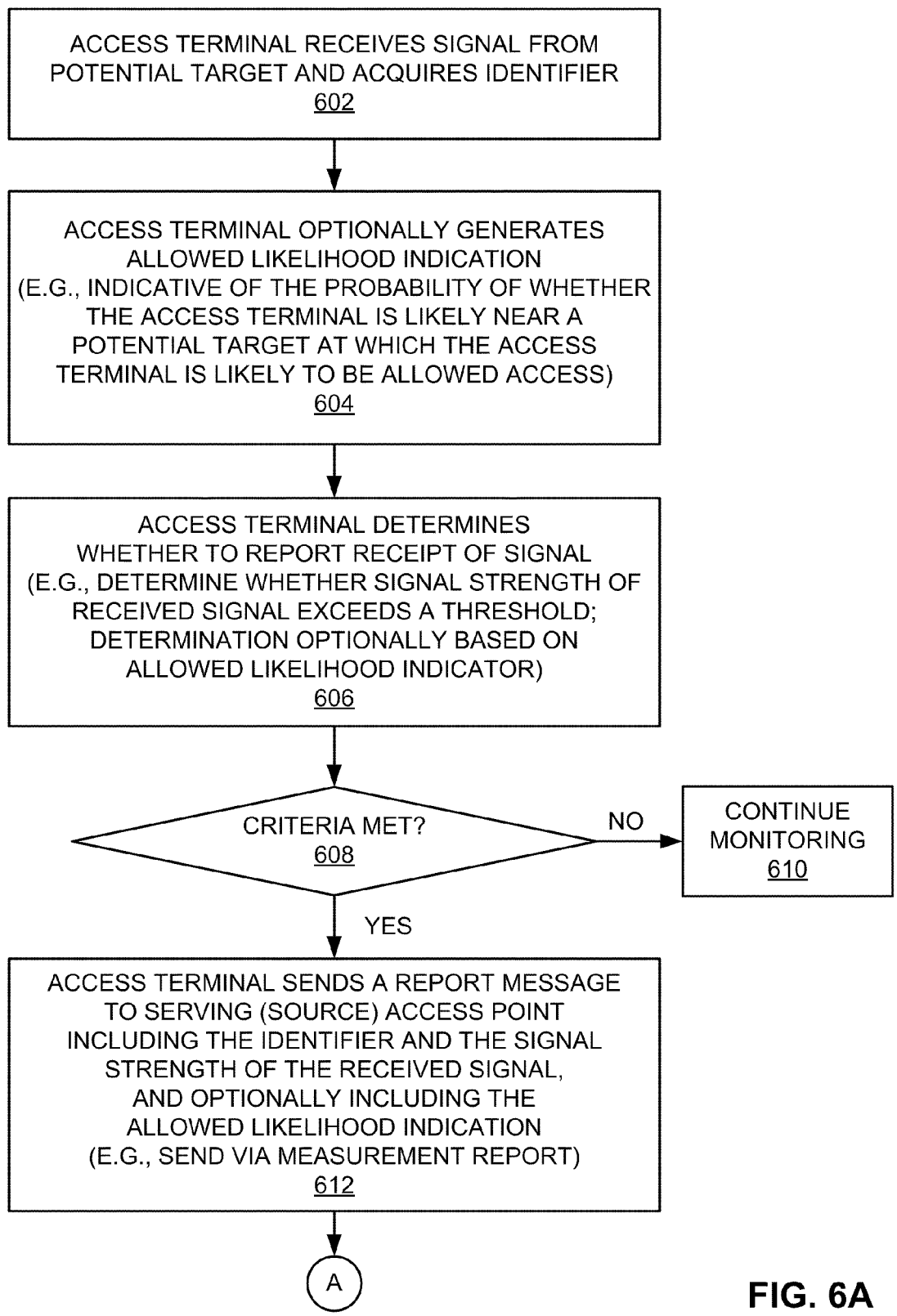
FIGS. 6A, 6B, 6C, and 6D are a flowchart of several sample aspects of operations that may be performed in conjunction with an access terminal initiating connection re-establishment at a target.
Figure 6B:
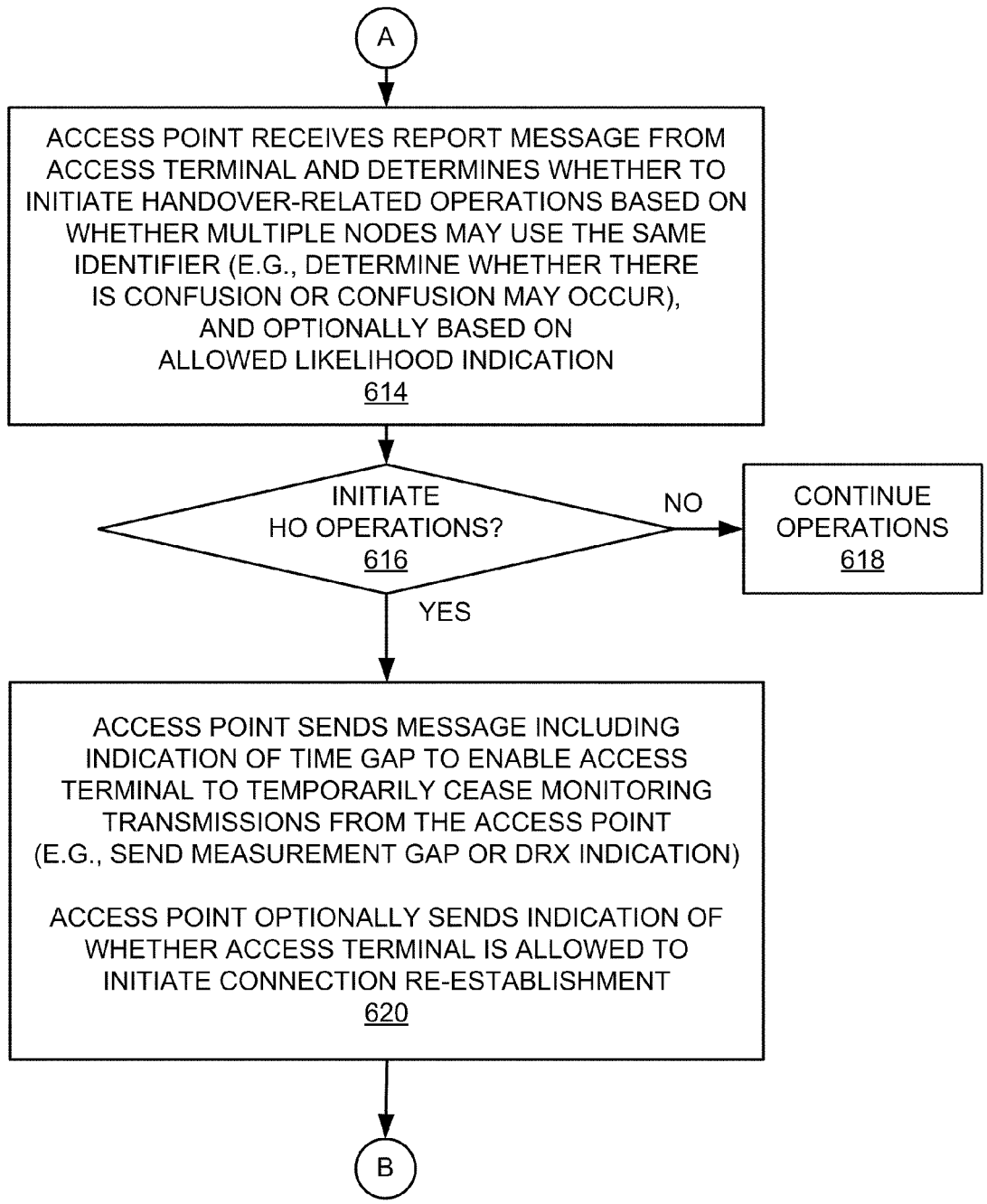

The access point (e.g., identifier controller 324) receives the message from the access terminal as represented by block 614 of FIG. 6B. The access terminal then determines whether to initiate handover-related operations or to keep serving the access terminal. In some aspects this determination may be based on a determination (e.g., by confusion controller 330) of whether multiple nodes may use the reported identifier. This operation may be performed, for example, as described above at block 516.

In some cases the determination of block 614 is based on an allowed likelihood indication received from the access terminal. For example, if the indication indicates a low probability (e.g., below a threshold), the access point may not initiate handover. Conversely, if the indication indicates a high probability (e.g., at or above a threshold), the access point may initiate handover (e.g., subject to other handover criteria being met).

As represented by blocks 616 and 618, if a decision is made to not perform a handover, the access point may continue with regular operations (e.g., continue serving the access terminal).

As represented by block 620, if a decision is made to perform a handover and confusion is detected, the access point sends one or more messages to the access terminal. For example, an asynchronous time gap indication as described above at block 522 may be sent to enable the access terminal to acquire the second identifier. In addition, in some implementations the access point may send an indication of whether the access terminal is allowed to initiate connection re-establishment.

Figure 6C:
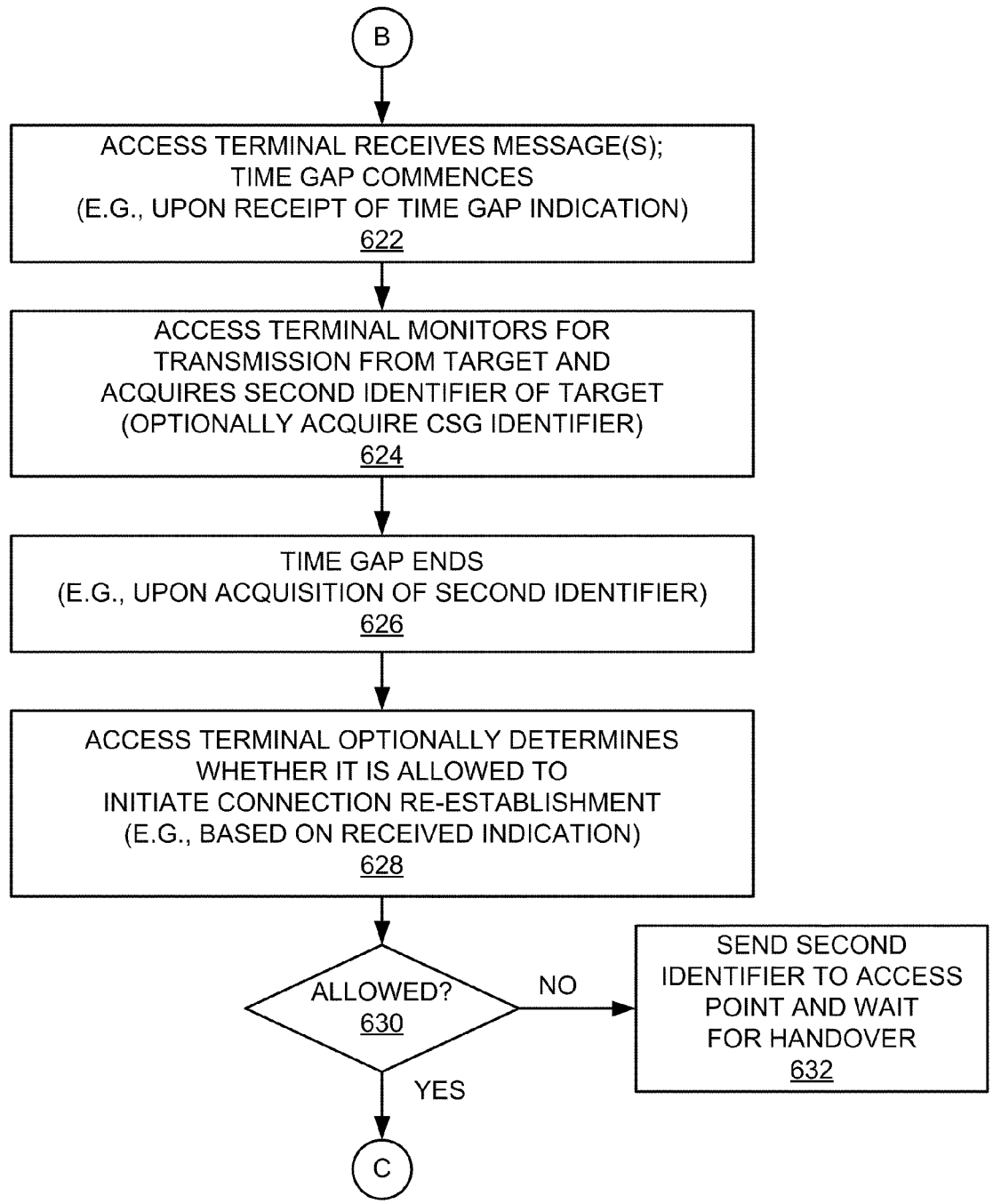
Figure 6D:
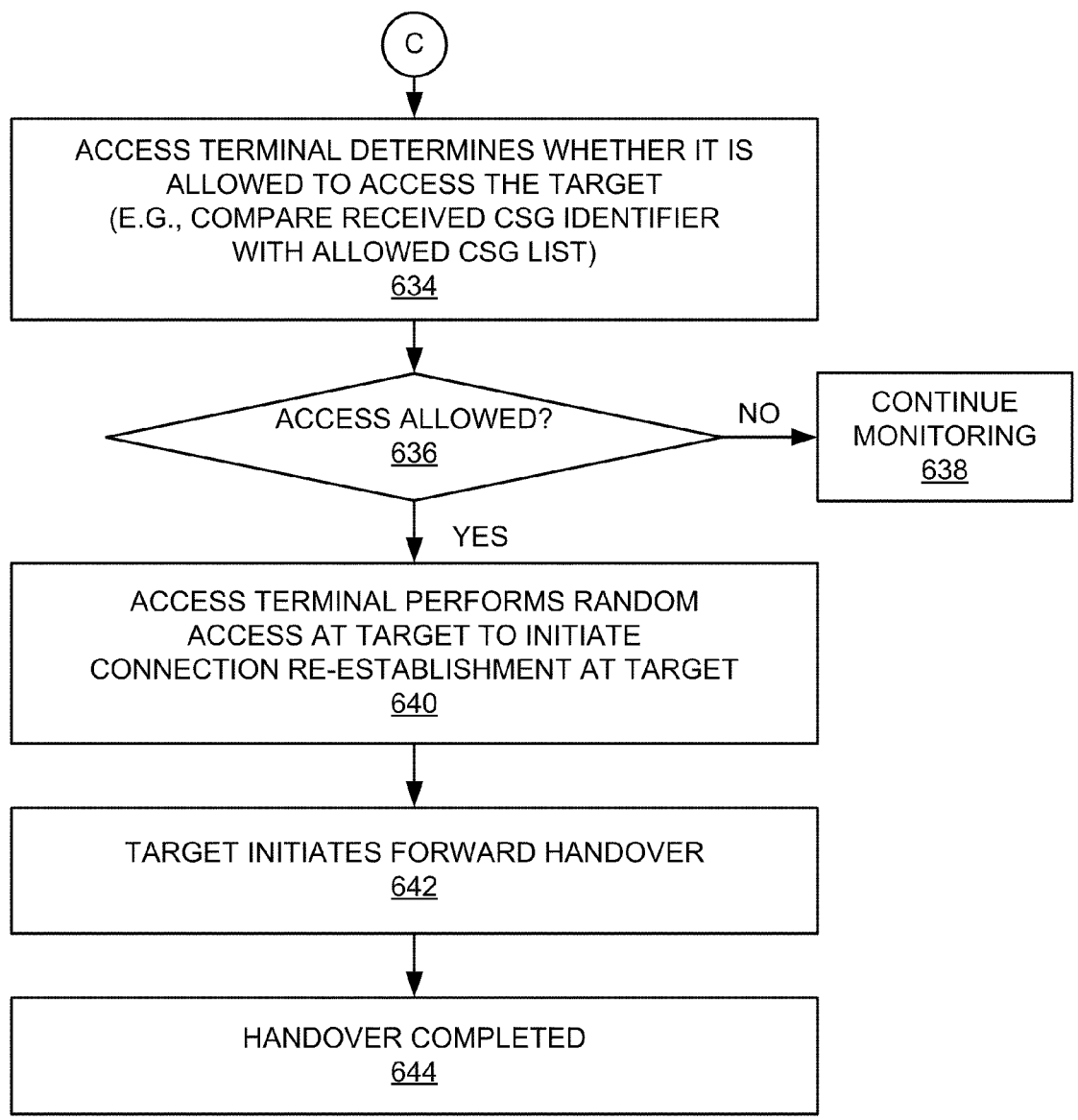

As represented by block 622 of FIG. 6C, the access terminal (e.g., communication controller 314) receives the time gap indication and, in some cases, the re-establishment indication. As above, the time gap for reading the second identifier may commence upon receipt of the time gap indication.

As represented by block 624, the access terminal may monitor for transmissions from the target access point during the time gap. As a result, the access terminal (e.g., indication controller 324) may acquire the second identifier as discussed at block 526. In addition, in some implementations the access terminal (e.g., identifier controller 322) may acquire another identifier associated with the target access point. For example, the access terminal may acquire an indication of a group to which the target belongs (e.g., a closed subscriber group) that is broadcast by the target. The time gap may then terminate as represented by block 626 (e.g., once the identifier(s) is/are obtained).

Referring now to block 628, as indicated above, in some implementations the access terminal may be conditionally allowed to initiate connection re-establishment. For example, the access terminal may only be allowed to initiate connection re-establishment if it receives authorization to do so (e.g., by receiving a corresponding indication from a serving access point or some other node).

Accordingly, as represented by blocks 628 and 630, the access terminal (e.g., handover controller 318) determines whether it is allowed to initiate connection re-establishment (e.g., based on whether an indication was received at block 620). If not, as represented by block 632, the access terminal may simply send a message (e.g., a measurement report) that includes the second identifier to the access point. The access terminal may then wait for the access point to determine whether handover is warranted. If the access terminal is allowed to initiate connection re-establishment, the operational flow instead proceeds to block 634 of FIG. 6D.

As represented by block 634, the access terminal (e.g., access controller 326) determines whether it is allowed to access the target access point. For example, as discussed in more detail below, some access points (e.g., a Home eNodeB) may only provide access to a select set of access terminals (e.g., the access terminals belonging to a certain user).

The determination of block 634 may be accomplished in various ways. In some cases the access terminal maintains a list of access points that the access terminal is allowed to access (which may be referred to as an allowed list).

In some implementations the allowed list may comprise a listing of the access points (e.g., as identified by unique identifiers such as GCIs) that the access terminal is allowed to access. In this case, upon acquiring a second identifier that uniquely identifies a potential target, the access terminal 102 may use the list to determine whether the access terminal 102 is allowed to access the potential target.

In some implementations the allowed list may comprise a listing of one or more groups (e.g., group identifiers such as CSG IDs) that allow access by the access terminal. In this case, the access terminal 102 may compare a corresponding identifier (e.g., a CSG ID) it receives from the target access point with the identifiers in the allowed list to determine whether access is allowed.

As represented by blocks 636 and 638, if access is not allowed, the access terminal may continue monitoring for signals from neighboring access points.

As represented by block 640, if access is allowed, the access terminal (e.g., handover controller 318) attempts to re-establish the current connection at the target access point. To this end, the access terminal may perform a random access at the target access point and send a re-establishment request to the target.

As represented by block 642, the target access point may then initiate a forward handover by initiating backhaul signaling with the source access point to complete the handover. The target access point and the access terminal then exchange messages to complete the re-establishment, and release the source access point to complete the handover (block 644). In this case, the initiation of the forward handover may serve as an indication to the access point that the time gap has ended.

FIGS. 7A-7D describe a scheme where, in the event confusion is detected, an access point prepares multiple target nodes for handover. In some aspects, this approach may reduce the time it takes to hand the access terminal over to the desired target. The scheme of FIGS. 7A-7D also will be described in the context of a confusion resolution process where an access terminal reports a first identifier to an access point if the associated signal exceeds a threshold, then acquires a second identifier (e.g., GCI) upon receiving an indication of an asynchronous time gap from the access point, and then initiates a connection re-establishment at the target that broadcast the second identifier. Again, it should be appreciated that the disclosure of FIGS. 7A-7D may be applicable to other confusion resolution processes that do not include all of the operations described below.

The operations of blocks 702-720 may be similar to the operations of blocks 602-620 of FIG. 6, respectively. Accordingly, these operations will not be described again.

Figure 7A:
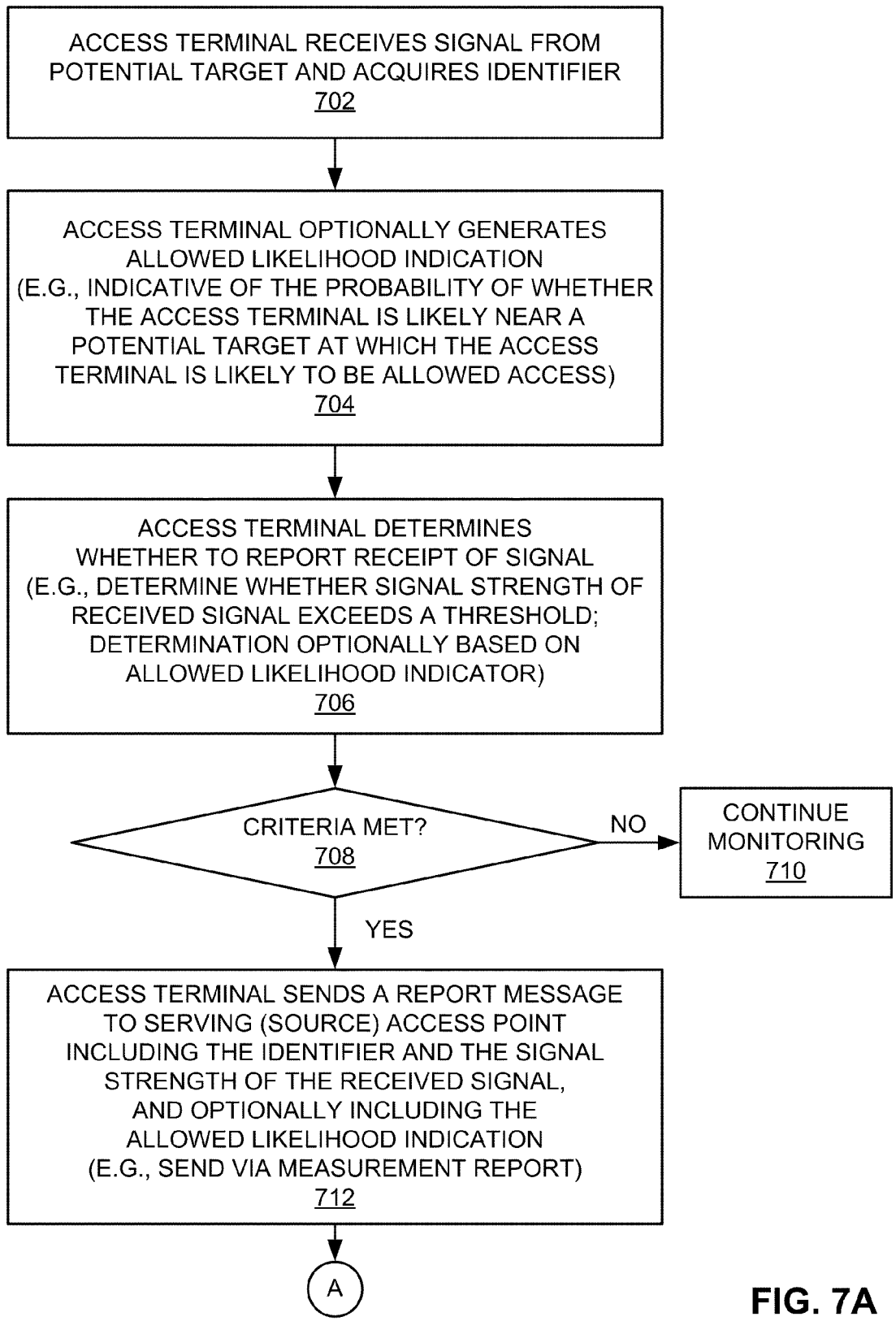
FIGS. 7A, 7B, 7C, and 7D are a flowchart of several sample aspects of operations that may be performed in conjunction with preparing multiple targets for handover.
Figure 7B:
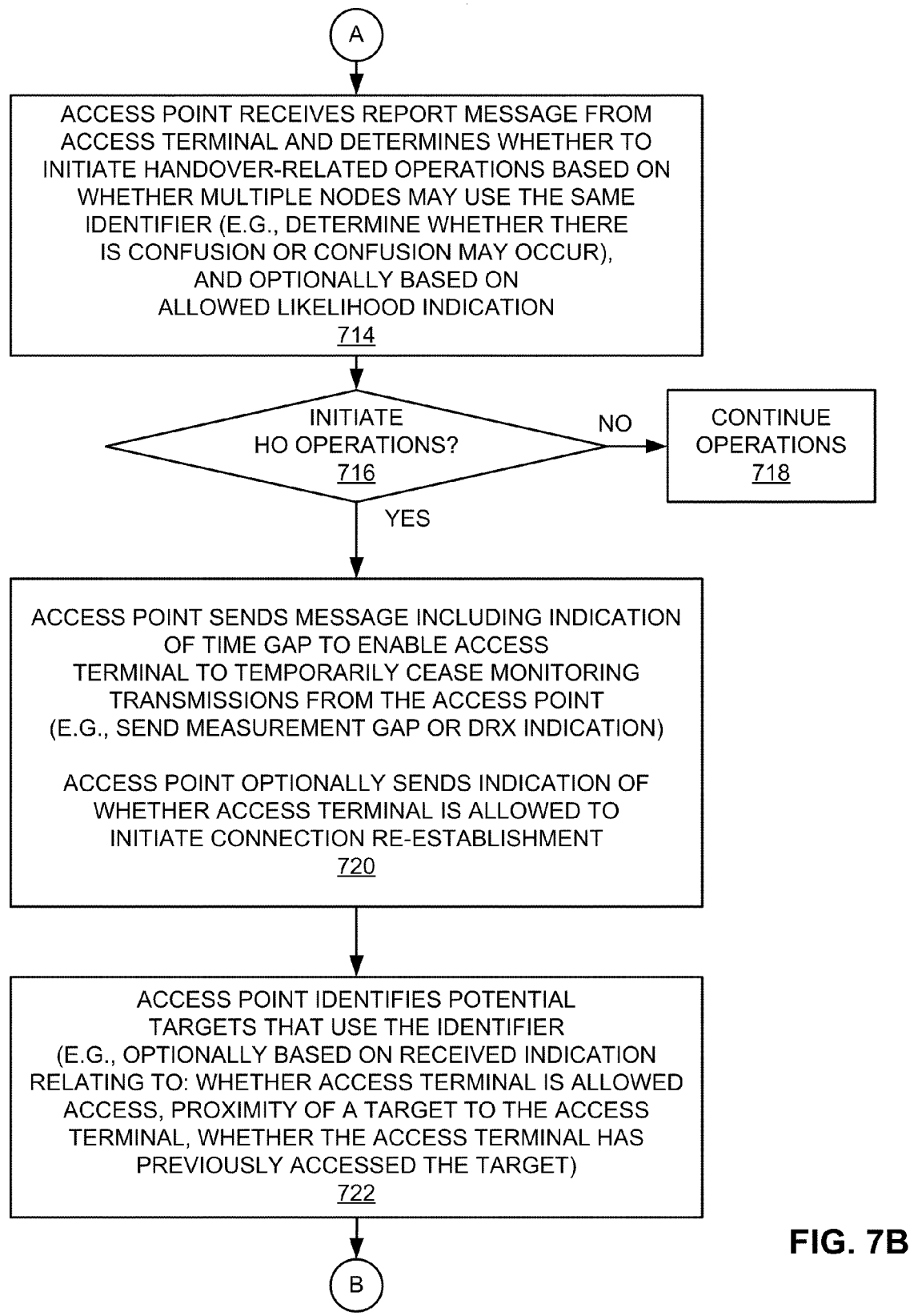

As represented by block 722 of FIG. 7B, in conjunction with providing the time gap to enable the access terminal to acquire the second identifier (block 720), the access point (e.g., the handover controller 320) may identify one or more target access points to prepare for handover. That is, in the event identifier (e.g., PCID) confusion is detected, multiple potential targets may be prepared for handover to increase the likelihood that the desired target will be prepared to handle a re-establishment request from the access terminal. In this way, a handover may be completed more quickly once the re-establishment message is received as compared to the process of FIGS. 6A-6D (where the source and target exchange handover command-related messages after the re-establishment request is issued).

The access point may employ various schemes to identify the potential targets to prepare for handover. In some cases the access point may prepare all of the access points of which it is aware that use the same identifier as the reported identifier. In some cases the access point may elect to prepare only a portion of these access points. Several examples of criteria that may be employed to select the access points to be prepared for handover follow.

In some implementations access points where the access terminal is known to be allowed are prioritized for handover preparation. For example, an access terminal may be known to be allowed at an access point based on the CSG ID of that access point appearing in the allowed CSG list of the access terminal. An access terminal may be know to be allowed at an access point based on the access point being an unrestricted CSG access point or a hybrid CSG access point. An access terminal may be known to be allowed at an access point based on the access point being an open access point. Conversely, access points where the access terminal is known to not be allowed may not be prepared for handover. Accordingly, the access terminal (e.g., handover controller 320) may receive an indication regarding whether the access terminal is allowed to access an access point and prioritize the identification of block 722 based on the indication.

In some implementations access points in the vicinity of the current location of the access terminal are prioritized for handover preparation. For example, the access terminal may send an indication of its location to its serving access point. The serving access point may determine, based on this location indication, whether the access terminal is near an access point that uses the confusing identifier. If so, the serving access point may give higher priority to preparing this access point for handover. In some cases the access terminal location may be known based on GPS reports. In some cases the access terminal location may be known based on other access points (including non-macro access points) that the access terminal has visited in the past. In these cases, the source may prepare these nearby and/or previously visited access points and, optionally, the neighbor access points of the previously visited access points. Thus, in some cases, the access terminal (e.g., handover controller 320) may receive an indication regarding whether the access terminal is near an access point and prioritize the identification of block 722 based on this indication. Also, in some cases, the access terminal (e.g., handover controller 320) may receive an indication regarding whether the access terminal has previously accessed an access point and prioritize the identification of block 722 based on this indication. Here, the indication may be received, for example, from the access point or other network nodes (e.g., access points where each access point maintains a list of the access terminals that have gained access; or a centralized network node that maintains a record of which access points have been accessed by which access terminals).

Figure 7C:
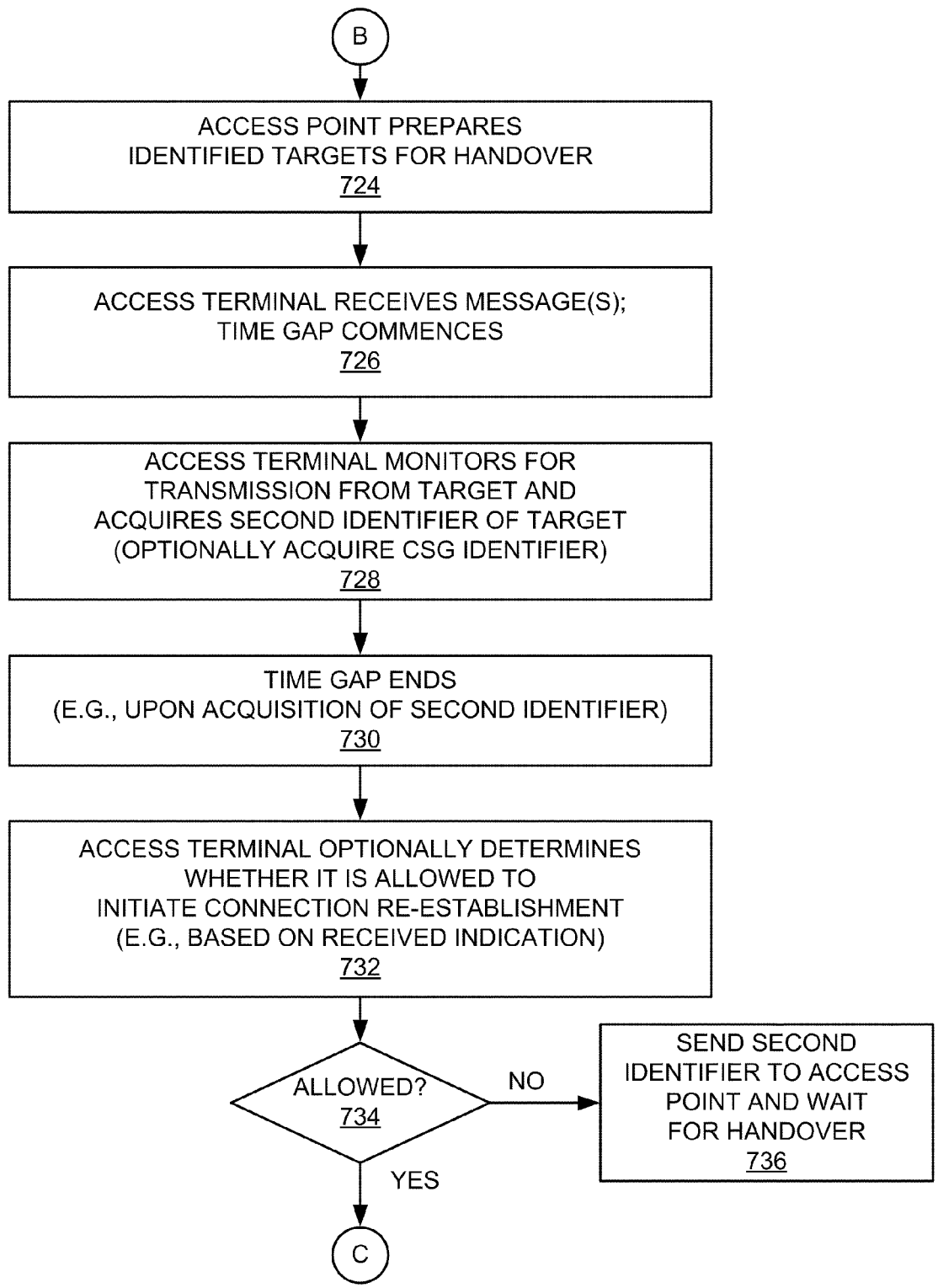

Referring to block 724 of FIG. 7C, once the potential targets are identified, the access point (e.g., handover controller 320) prepares each of the potential targets for handover. For example, the access point may send a handover request message to each of these potential targets and receive corresponding responses. In conjunction with this operation, the access point may prepare or obtain handover preparation information for each of the potential targets. This information may include, for example, a temporary identifier (e.g., C-RNTI) allocated on each of the target cells, security information, and other configuration information commonly used for handover.

The operations of blocks 726-744 may be similar to the operations of blocks 622-640 of FIG. 6, respectively. Accordingly, the description these operations will not be repeated.

Figure 7D:
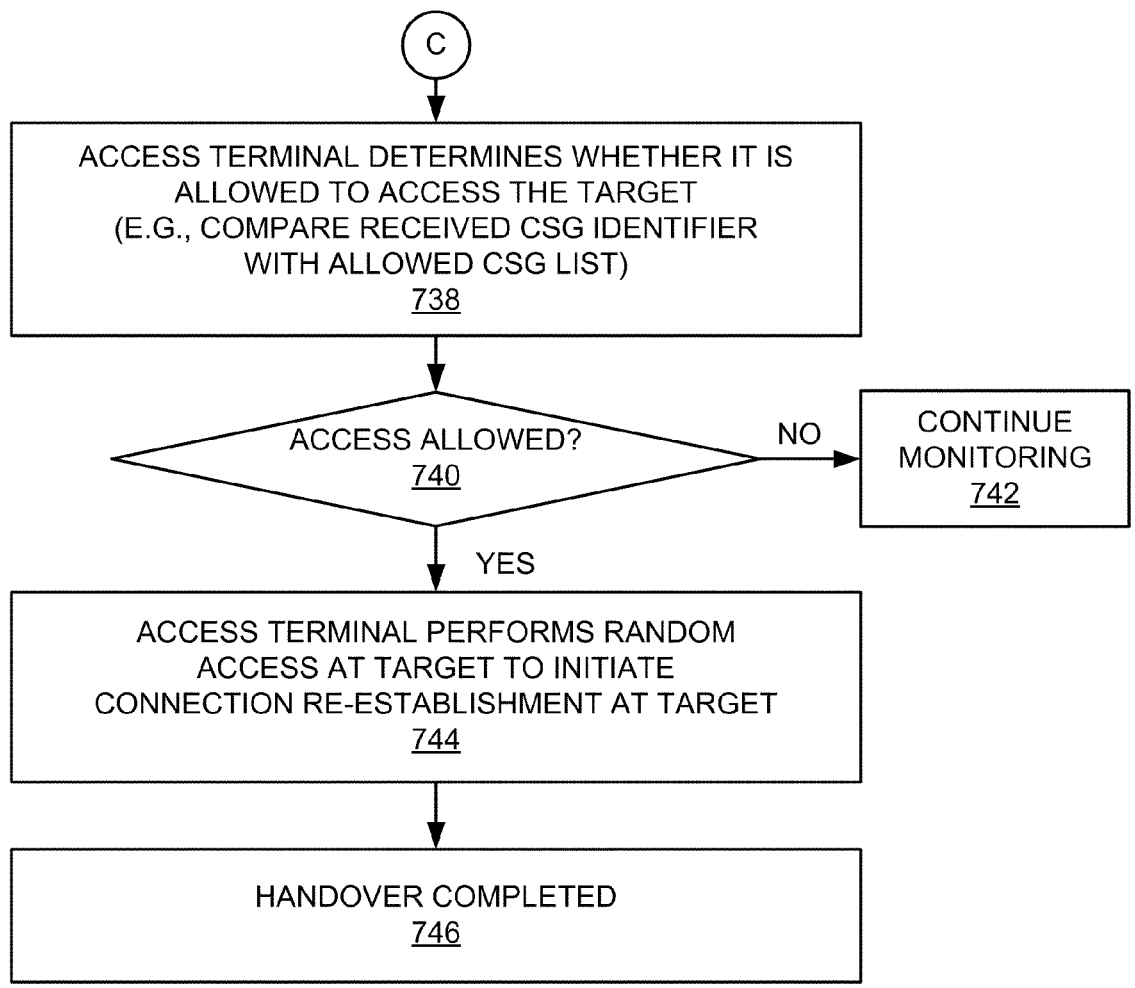

As represented by block 746 of FIG. 7D, in the event the desired target was one of the potential targets prepared by the source access point, handover may be completed expeditiously via the exchange of re-establishment messages between the target and the access terminal. Upon release of the source access point, the handover is completed. In this case, the release of the source access point may serve as an indication to the access point that the time gap has ended.

In the event the source access point did not prepare the correct target for handover, the handover procedure may fall back to the procedure of blocks 642-644 of FIG. 6. That is, upon receiving a re-establishment request from the access terminal, the unprepared target may initiate a forward handover.

FIGS. 8A-8D describe a scheme where an access point sends handover preparation information relating to the preparation of one or more target nodes for handover to an access terminal. In this case, the access terminal may determine whether it is allowed to access a target based on the handover preparation information. This scheme will be described in the context of a confusion resolution process where an access terminal reports a first identifier to an access point if the associated signal exceeds a threshold, then acquires a second identifier (e.g., GCI) upon receiving an indication of an asynchronous time gap from the access point, and then sends a reconfiguration complete message to the target that broadcast the second identifier. Again, it should be appreciated that the disclosure of FIGS. 8A-8D may be applicable to other confusion resolution processes that do not include all of the operations described below.

The operations of blocks 802-818, 820, and 822 may be similar to the operations of blocks 702-718, 722, and 724 of FIG. 7, respectively. Accordingly, the description of these operations will not be repeated.

Figure 8A:
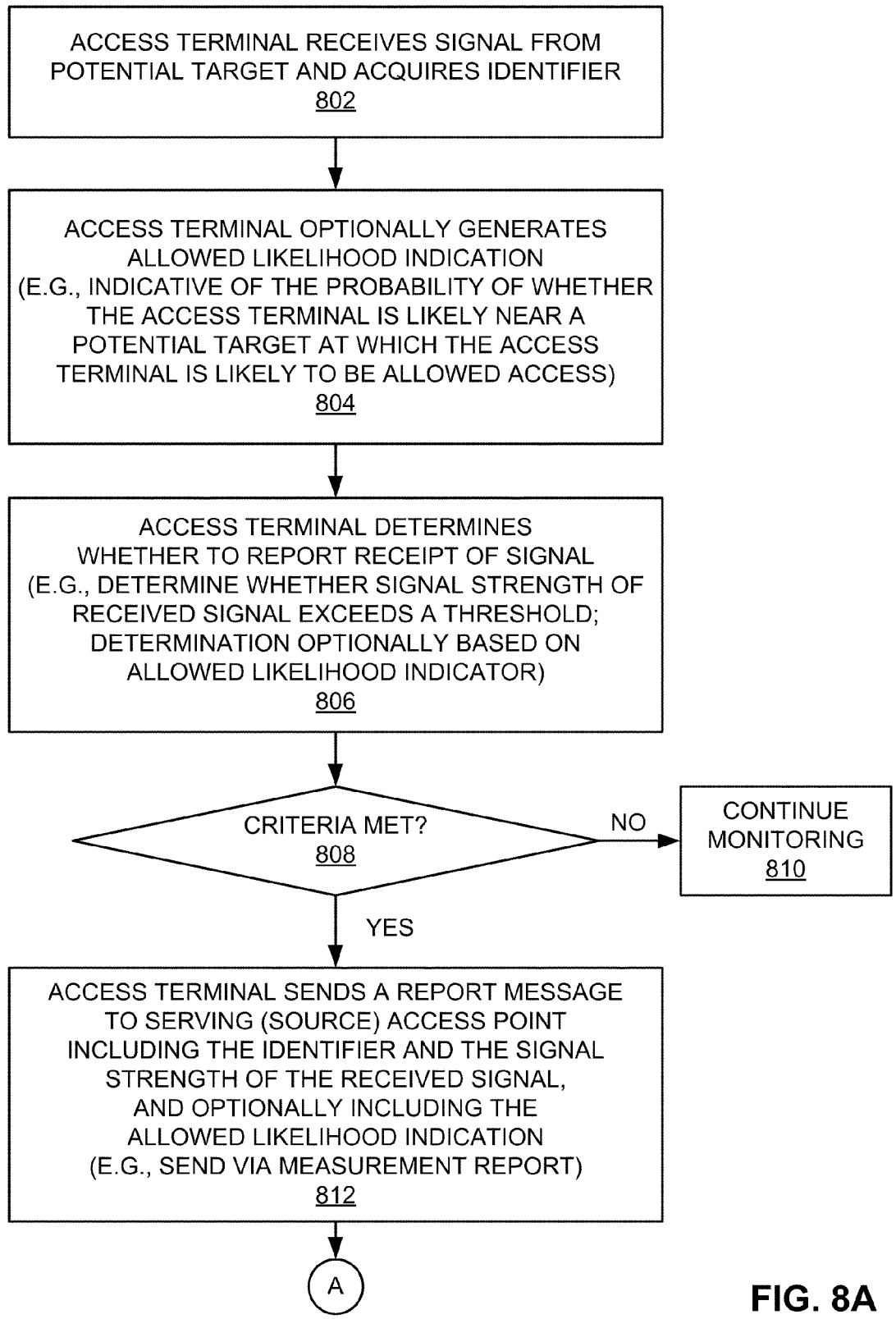
FIGS. 8A, 8B, 8C, and 8D are a flowchart of several sample aspects of operations that may be performed in conjunction with providing handover preparation information to an access terminal.
Figure 8B:
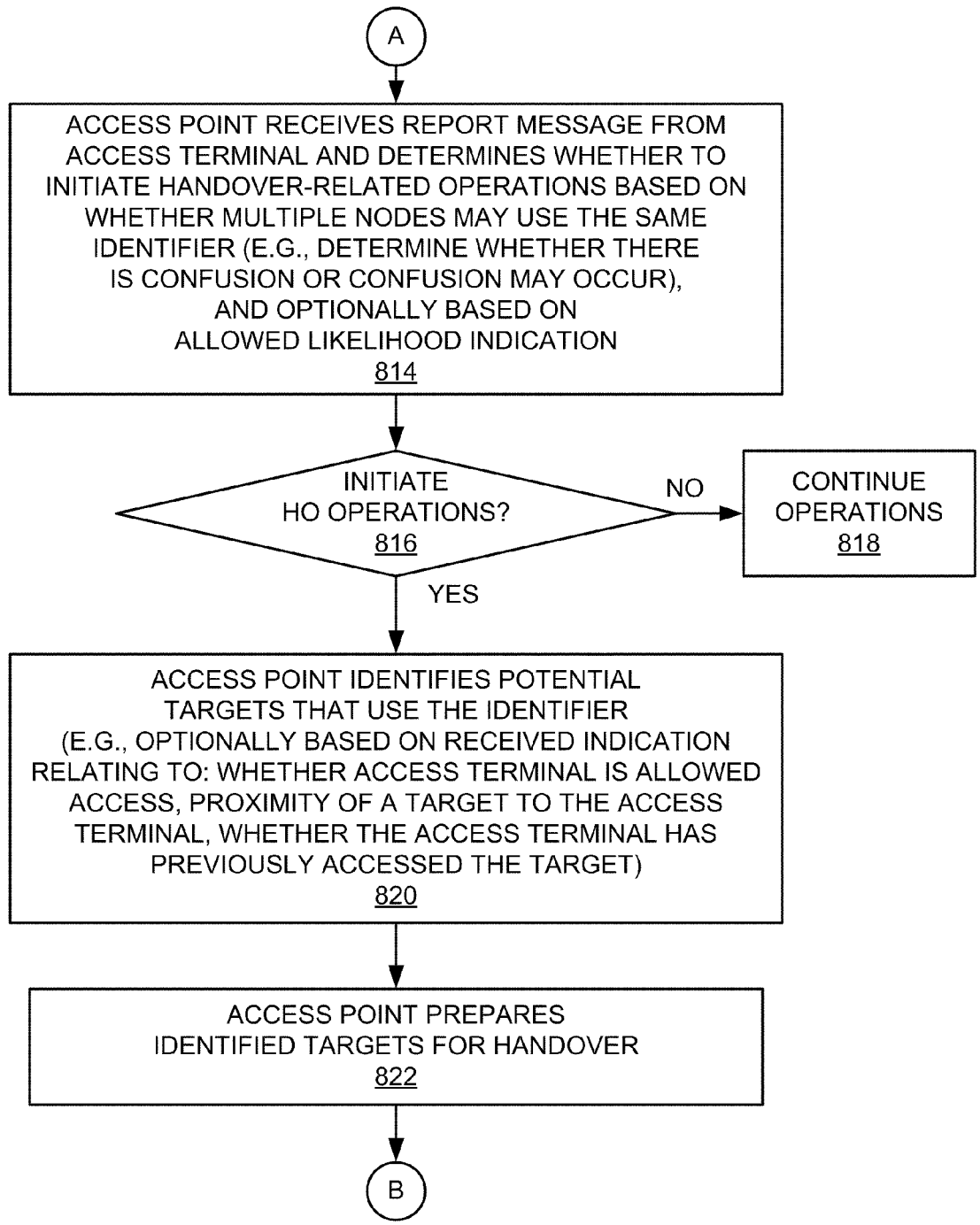
Figure 8C:
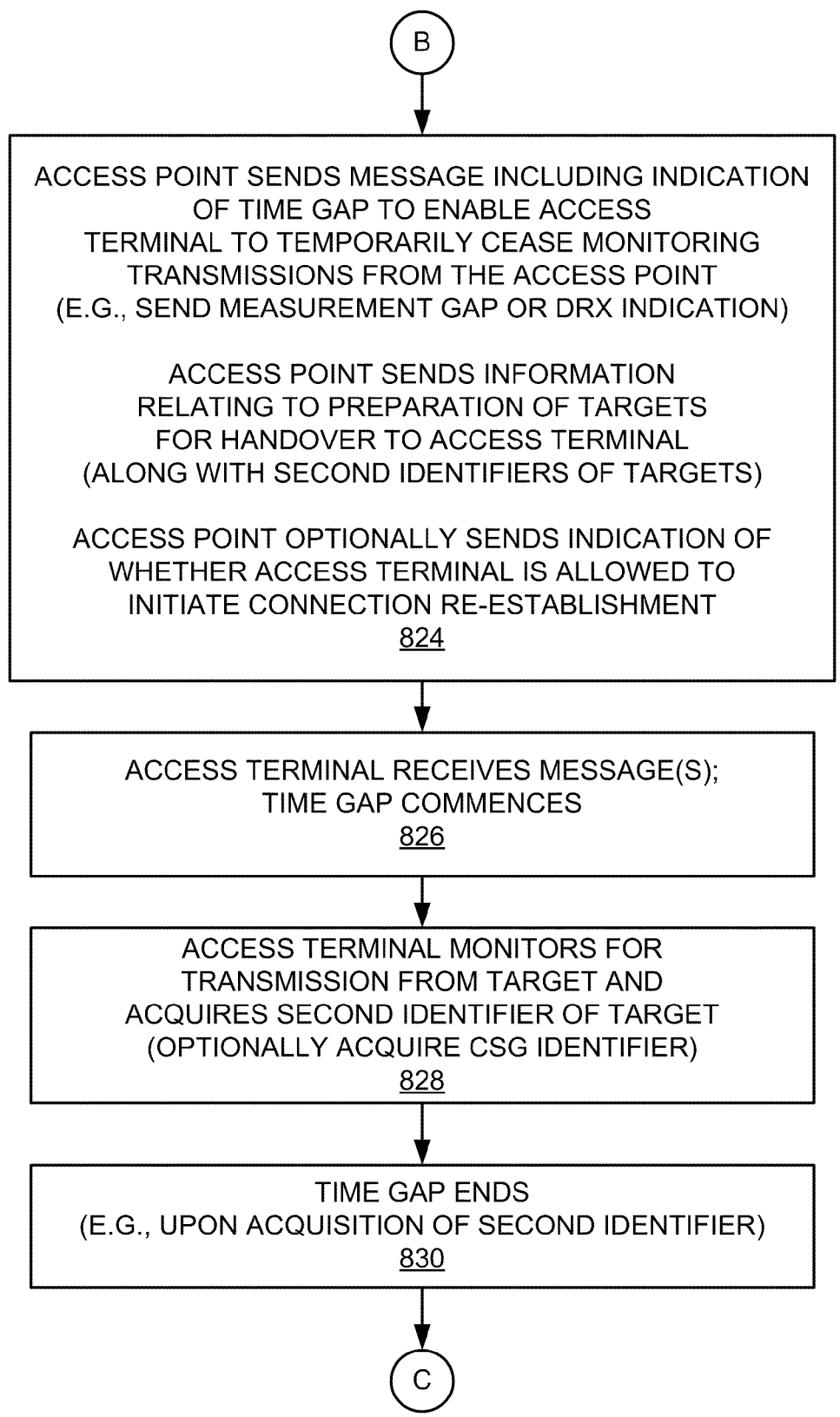

As represented by block 824 of FIG. 8C, in addition to sending the time gap indication and optionally sending the re-establishment indication as discussed above at block 720, the access point may send handover preparation information to the access terminal. For example, the access point (e.g., handover controller 320) may send the handover preparation material described at block 724 that corresponds to each target access point that was prepared for handover at block 822. In conjunction with this information, the access point (e.g., handover controller 320) also may send the second identifier (e.g., GCI) of each of the prepared target access points to the access terminal.

As represented by block 826, the access terminal receives the time gap indication and, in some cases, the re-establishment indication as discussed above. In addition, the access terminal (e.g., handover controller 318) may receive the handover preparation information from the source access point. Again, the time gap for reading the second identifier may commence upon receipt of the time gap indication. As represented by block 828, the access terminal (e.g., identifier controller 322) may monitor for transmissions from the target access point during the time gap to acquire the second identifier and, optionally, a group identifier (e.g., CSG ID) as discussed above. The time gap may end upon acquisition of the identifier(s) (block 830).

Figure 8D:
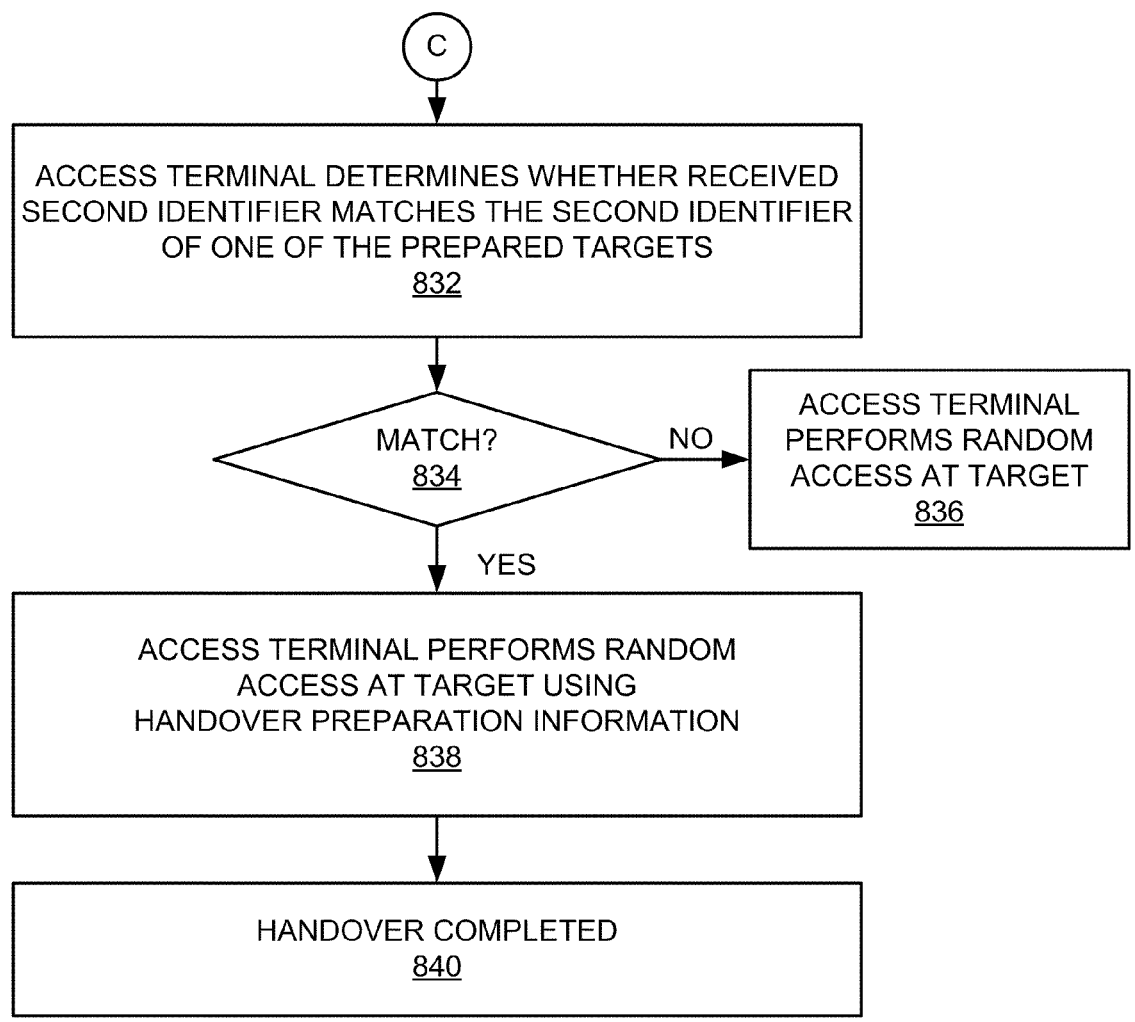

As represented by block 832 of FIG. 8D, the access terminal (e.g., handover controller 318) determines whether the target from which the access terminal received a signal is one of the targets that were prepared by the source access point. For example, the access terminal may determine whether the identifier received at block 828 matches a corresponding target identifier (e.g., GCI) that was received with the handover preparation information at block 826.

As represented by blocks 834 and 836, if there is no match (i.e., the desired target has not been prepared), the access terminal may fall back to the procedure of blocks 642-644 of FIG. 6. That is, if the access terminal is allowed to access the desired target (e.g., as determined above), the access terminal sends a re-establishment request to the desired target. Upon receiving this re-establishment request, the unprepared target may initiate a forward handover.

As represented by block 838, if there is a match at block 834, the access terminal (e.g., handover controller 318) may perform a random access at the target access point and send a reconfiguration complete message to the target. In this case, the access terminal uses the handover preparation information for this target that was provided by the source access point to complete the handover. Accordingly, the handover may be completed even quicker in this scheme, since additional messaging between the access terminal and the target may not be needed (block 840). Again, the release of the source access point may serve as an indication to the access point that the time gap has ended.

Figure 9:
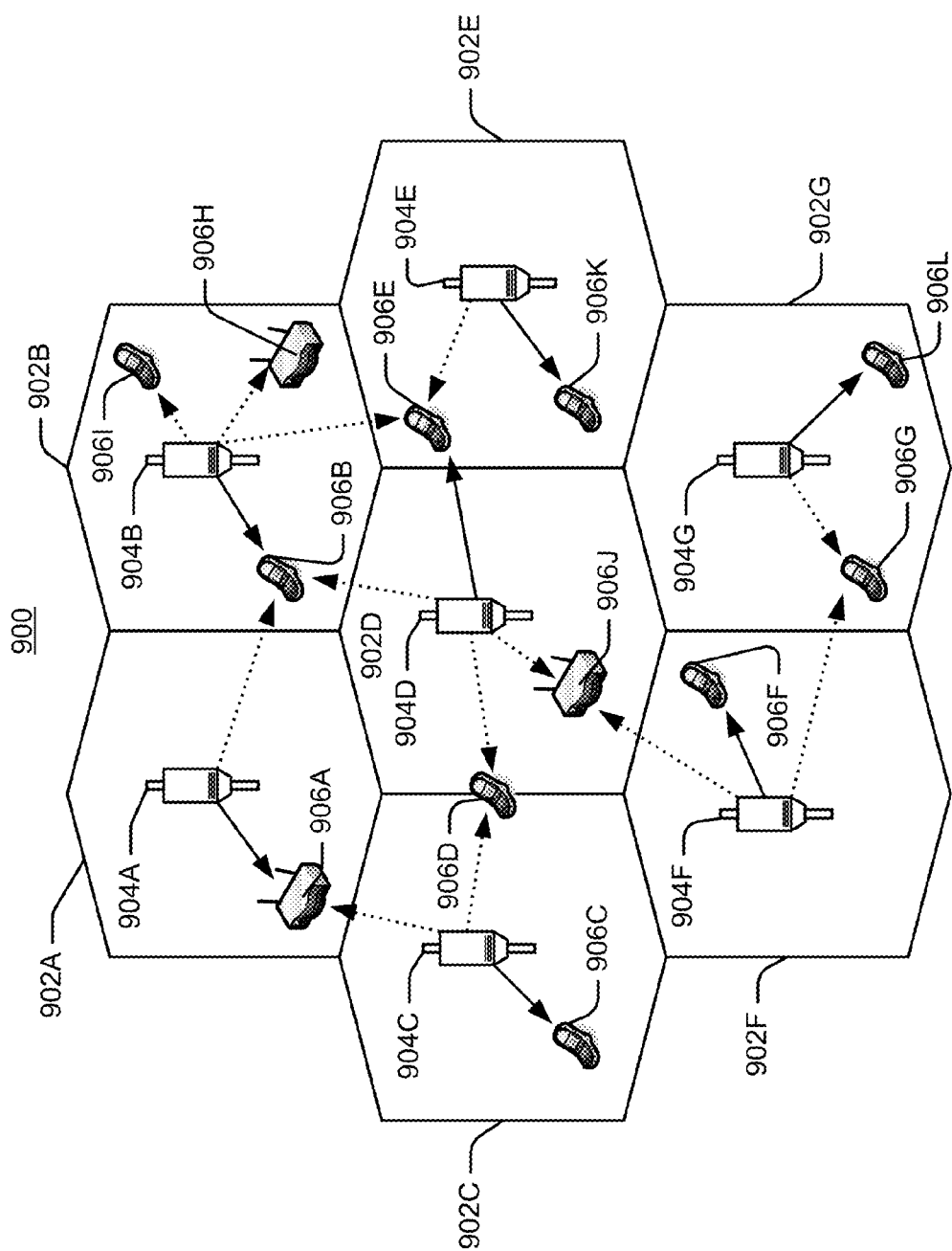
FIG. 9 is a simplified diagram of a wireless communication system.
Figure 10:
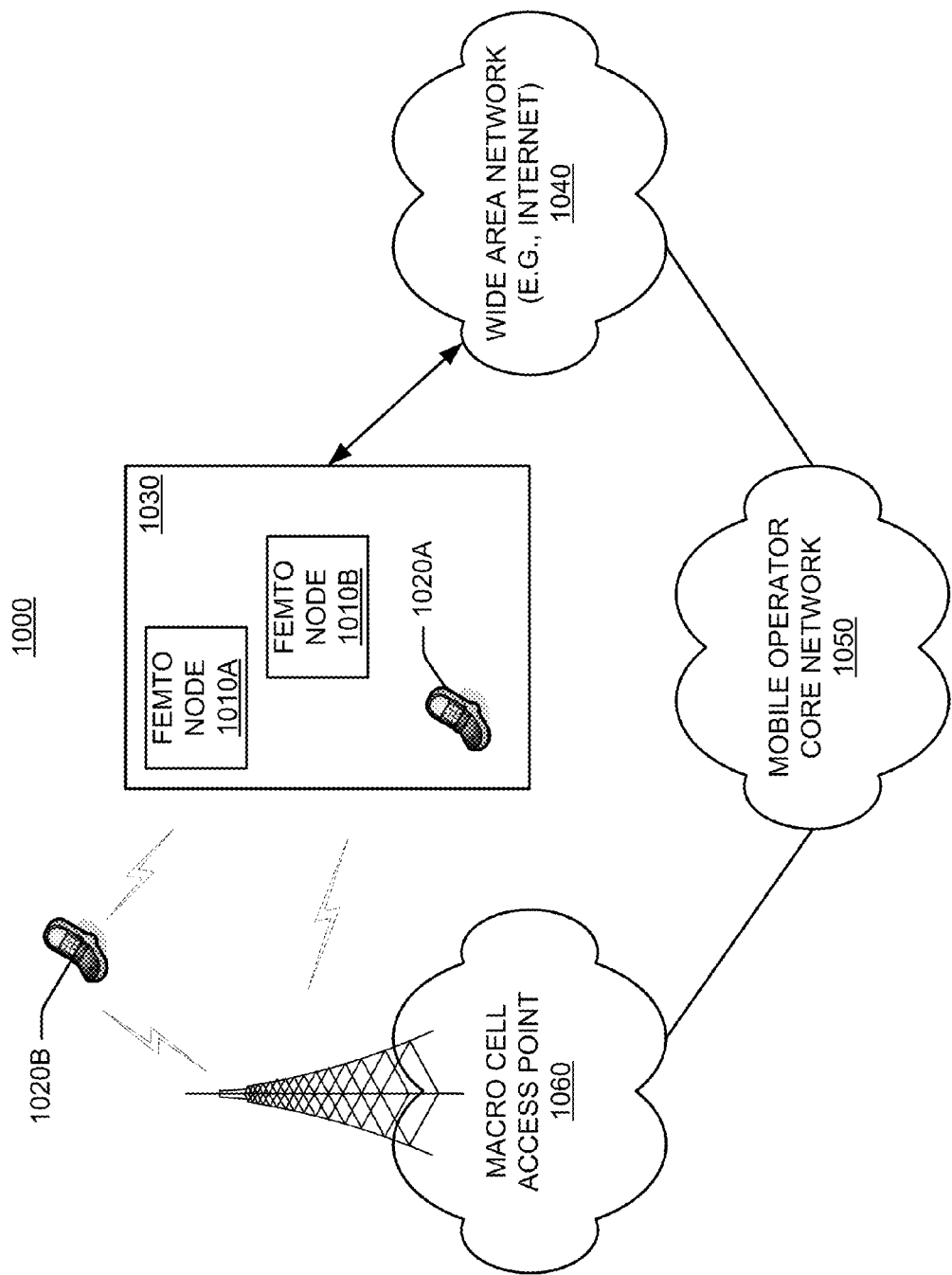
FIG. 10 is a simplified diagram of a wireless communication system including femto nodes.

As mentioned above, the teaching herein may be implemented in network that employs macro access points and femto nodes. FIGS. 9 and 10 illustrate examples how access points may be deployed in such a network. FIG. 9 illustrates, in a simplified manner, how cells 902 (e.g., macro cells 902A-902G) of a wireless communication system 900 may serviced by corresponding access points 904 (e.g., access points 904A-904G). Here, the macro cells 902 may correspond to the macro coverage areas 204 of FIG. 2. As shown in FIG. 9, access terminals 906 (e.g., access terminals 906A-906L) may be dispersed at various locations throughout the system over time. Each access terminal 906 may communicate with one or more access points 904 on a forward link ("FL") and/or a reverse link ("RL") at a given moment, depending upon whether the access terminal 906 is active and whether it is in soft handover, for example. Through the use of this cellular scheme, the wireless communication system 900 may provide service over a large geographic region. For example, each of the macro cells 902A-902G may cover a few blocks in a neighborhood or several square miles in rural environment.

FIG. 10 illustrates an example how one or more femto nodes may be deployed within a network environment (e.g., the system 900). In the system 1000 of FIG. 10, multiple femto nodes 1010 (e.g., femto nodes 1010A and 1010B) are installed in a relatively small area coverage network environment (e.g., in one or more user residences 1030). Each femto node 1010 may be coupled to a wide area network 1040 (e.g., the Internet) and a mobile operator core network 1050 via a DSL router, a cable modem, a wireless link, or other connectivity means (not shown).

The owner of a femto node 1010 may subscribe to mobile service, such as, for example, 3G mobile service, offered through the mobile operator core network 1050. In addition, an access terminal 1020 may be capable of operating both in macro environments and in smaller area coverage (e.g., residential) network environments. In other words, depending on the current location of the access terminal 1020, the access terminal 1020 may be served by a macro cell access point 1060 associated with the mobile operator core network 1050 or by any one of a set of femto nodes 1010 (e.g., the femto nodes 1010A and 1010B that reside within a corresponding user residence 1030). For example, when a subscriber is outside his home, the subscriber may be served by a standard macro access point (e.g., access point 1060) and when the subscriber is near or inside his home, the subscriber may be served by a femto node (e.g., node 1010A). Here, a femto node 1010 may be backward compatible with legacy access terminals 1020.

A femto node 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060).

In some aspects, an access terminal 1020 may be configured to connect to a preferred femto node (e.g., the home femto node of the access terminal 1020) whenever such connectivity is possible. For example, whenever the access terminal 1020A is within the user's residence 1030, it may be desired that the access terminal 1020A communicate only with the home femto node 1010A or 1010B.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred femto node 1010) using a Better System Reselection ("BSR"), which may involve a periodic scanning of available systems to determine whether better systems are currently available, and subsequent efforts to associate with such preferred systems. With the acquisition entry, the access terminal 1020 may limit the search for specific band and channel. For example, one or more femto channels may be defined whereby all femto nodes (or all restricted femto nodes) in a region operate on the femto channel(s). The search for the most preferred system may be repeated periodically. Upon discovery of a preferred femto node 1010, the access terminal 1020 selects the femto node 1010 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1010 that reside within the corresponding user residence 1030). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access points (e.g., femto nodes) that share a common access control list of access terminals.

Various relationships may thus exist between a given femto node and a given access terminal. For example, from the perspective of an access terminal, an open femto node may refer to a femto node with no restricted association (e.g., the femto node allows access to any access terminal).

A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

The teachings herein may be implemented in various types of communication devices. In some aspects, the teachings herein may be implemented in wireless devices that may be deployed in a multiple access communication system that may simultaneously support communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

Figure 11:
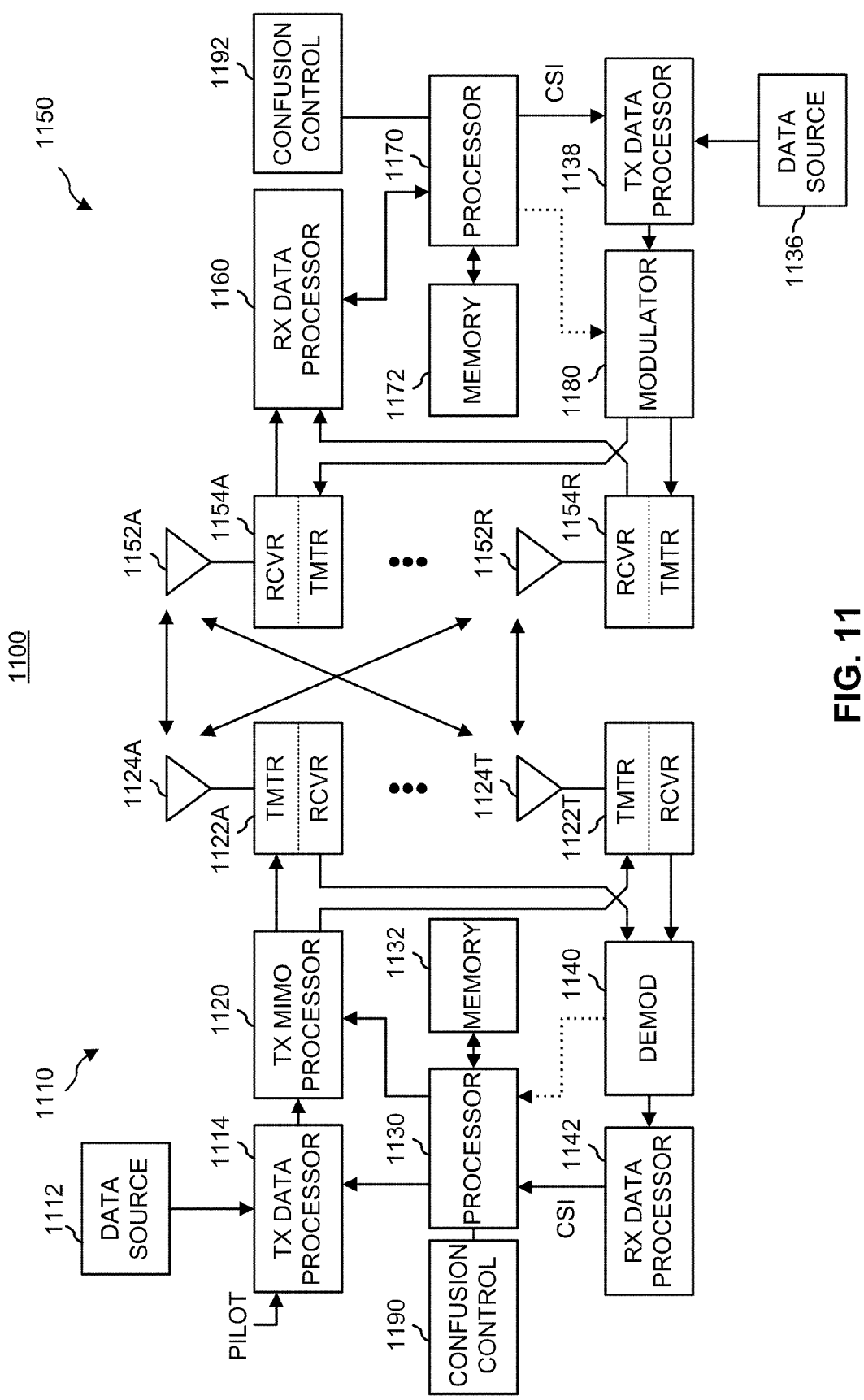
FIG. 11 is a simplified block diagram of several sample aspects of communication components.
Figure 12:
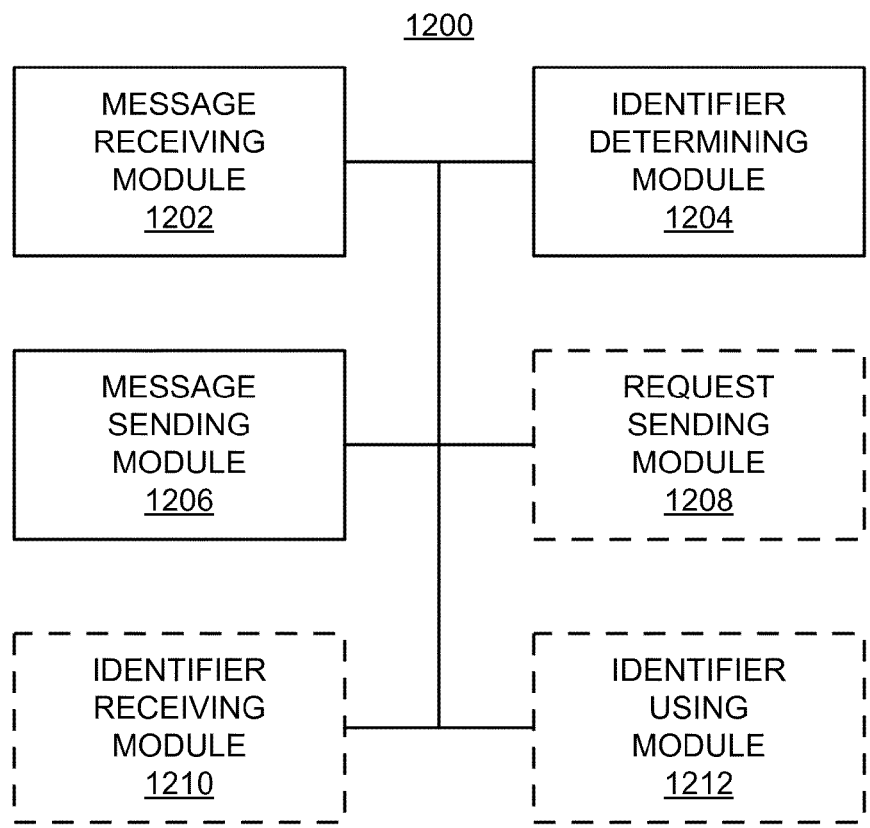
FIGS. 12-16 are simplified block diagrams of several sample aspects of apparatuses configured to resolve identifier confusion as taught herein.
Figure 13:
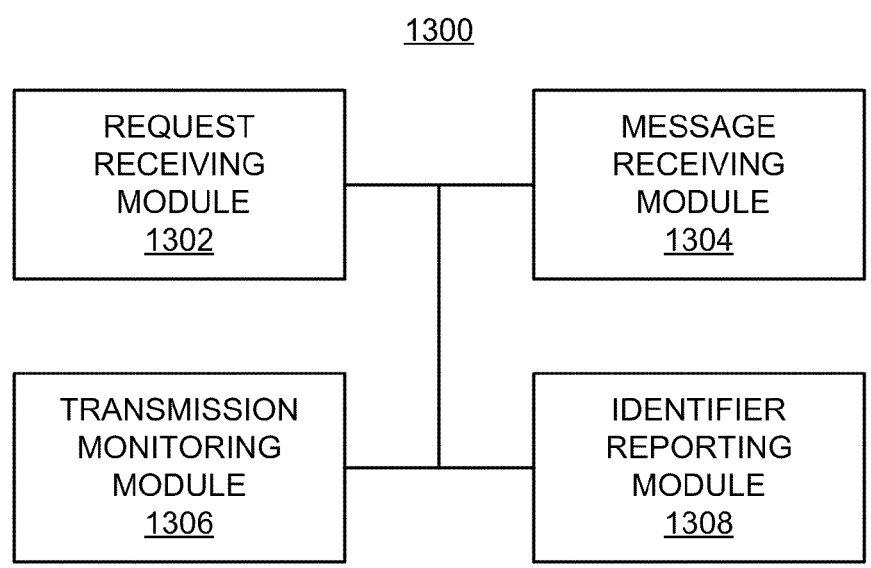
Figure 14:
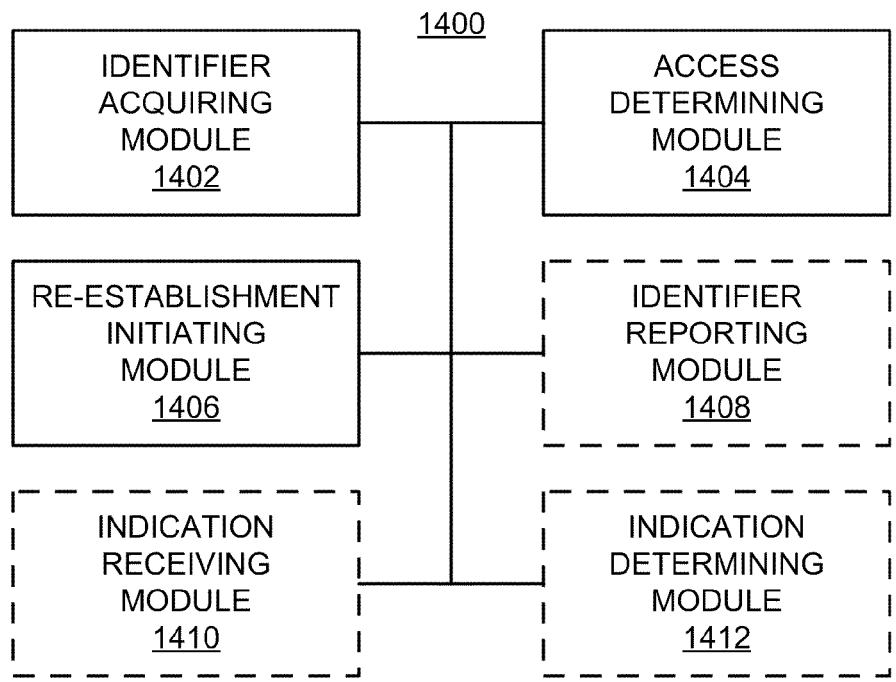
Figure 15:
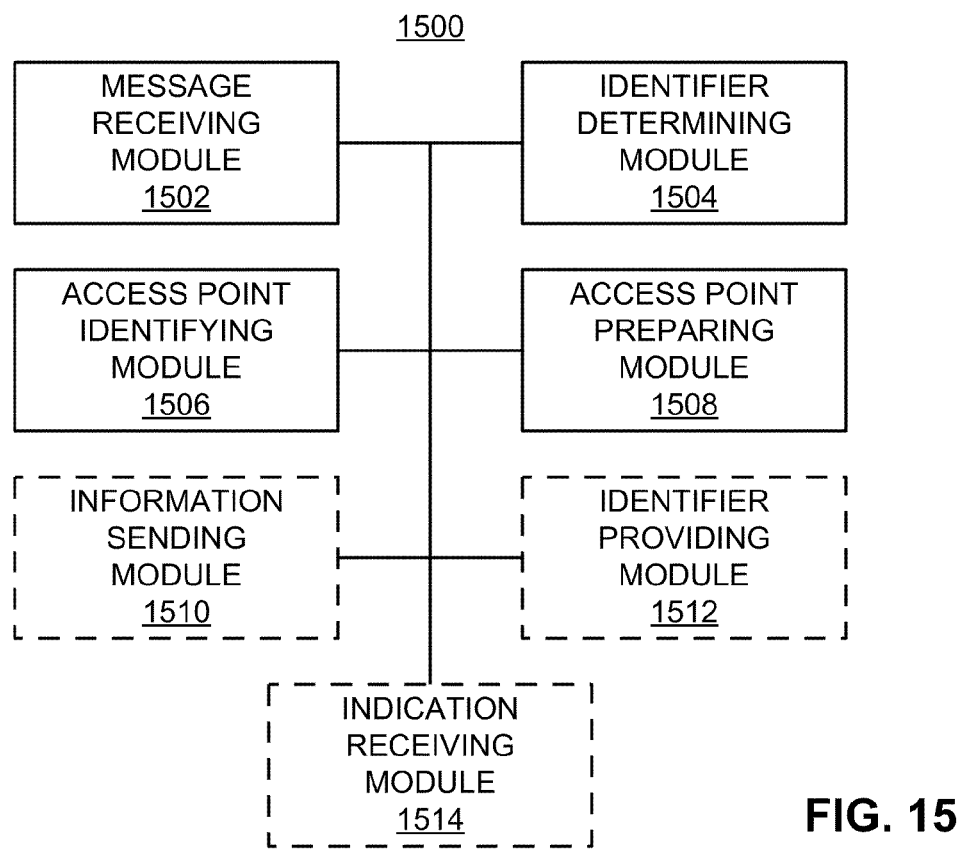
Figure 16:
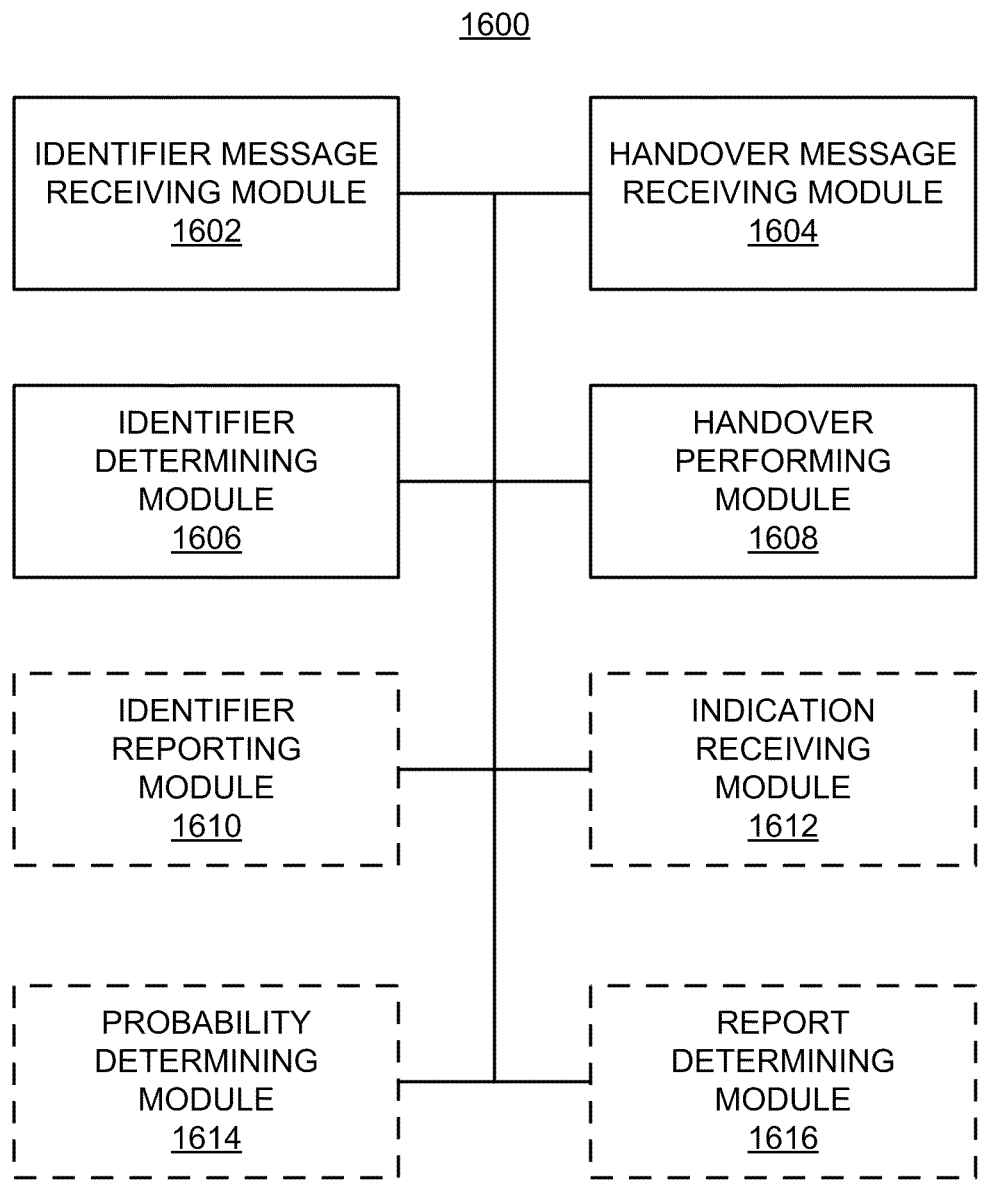

For illustration purposes, FIG. 11 describes sample communication components that may be employed in a wireless device in the context of a MIMO-based system 1100. The system 1100 employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

The system 1100 may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

The system 1100 includes a wireless device 1110 (e.g., an access point) and a wireless device 1150 (e.g., an access terminal). At the device 1110, traffic data for a number of data streams is provided from a data source 1112 to a transmit ("TX") data processor 1114.

In some aspects, each data stream is transmitted over a respective transmit antenna. The TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers ("XCVR") 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver ("XCVR") 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive ("RX") data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which precoding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator ("DE-MOD") 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform confusion control operations as taught herein. For example, a confusion control component 1190 may cooperate with the processor 1130 and/or other components of the device 1110 to send/receive signals to/from another device (e.g., device 1150) as taught herein. Similarly, a confusion control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the confusion control component 1190 and the processor 1130 and a single processing component may provide the functionality of the confusion control component 1192 and the processor 1170.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA", "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (IxRTT, IxEV-DO Re1O, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), a macro cell, a macro node, a Home eNB ("HeNB"), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 12-16, apparatuses 1200, 1300, 1400, 1500, and 1600 are represented as a series of interrelated functional modules. Here, a message receiving module 1202 may correspond at least in some aspects to, for example, an identifier controller as discussed herein. An identifier determining module 1204 may correspond at least in some aspects to, for example, a confusion controller as discussed herein. A message sending module 1206 may correspond at least in some aspects to, for example, a time gap controller as discussed herein. A request sending module 1208 may correspond at least in some aspects to, for example, an identifier controller as discussed herein. An identifier receiving module 1210 may correspond at least in some aspects to, for example, an identifier controller as discussed herein. An identifier using module 1212 may correspond at least in some aspects to, for example, a handover controller as discussed herein. A request receiving module 1302 may correspond at least in some aspects to, for example, an identifier controller as discussed herein. A message receiving module 1304 may correspond at least in some aspects to, for example, a communication controller as discussed herein. A transmission monitoring module 1306 may correspond at least in some aspects to, for example, a receiver as discussed herein. An identifier reporting module 1308 may correspond at least in some aspects to, for example, an identifier controller as discussed herein. An identifier acquiring module 1402 may correspond at least in some aspects to, for example, an identifier controller as discussed herein. An access determining module 1404 may correspond at least in some aspects to, for example, an access controller as discussed herein. A re-establishment initiating module 1406 may correspond at least in some aspects to, for example, a handover controller as discussed herein. An identifier reporting module 1408 may correspond at least in some aspects to, for example, an identifier controller as discussed herein. An indication receiving module 1410 may correspond at least in some aspects to, for example, a communication controller as discussed herein. An indication determining module 1412 may correspond at least in some aspects to, for example, a handover controller as discussed herein. A message receiving module 1502 may correspond at least in some aspects to, for example, an identifier controller as discussed herein. An identifier determining module 1504 may correspond at least in some aspects to, for example, a confusion controller as discussed herein. An access point identifying module 1506 may correspond at least in some aspects to, for example, a handover controller as discussed herein. An access point preparing module 1508 may correspond at least in some aspects to, for example, a handover controller as discussed herein. An information sending module 1510 may correspond at least in some aspects to, for example, a handover controller as discussed herein. An identifier providing module 1512 may correspond at least in some aspects to, for example, a handover controller as discussed herein. An indication receiving module 1514 may correspond at least in some aspects to, for example, a handover controller as discussed herein. An identifier message receiving module 1602 may correspond at least in some aspects to, for example, an identifier controller as discussed herein. A handover message receiving module 1604 may correspond at least in some aspects to, for example, a handover controller as discussed herein. An identifier determining module 1606 may correspond at least in some aspects to, for example, a handover controller as discussed herein. A handover performing module 1608 may correspond at least in some aspects to, for example, a handover controller as discussed herein. An identifier reporting module 1610 may correspond at least in some aspects to, for example, an identifier controller as discussed herein. An indication receiving module 1612 may correspond at least in some aspects to, for example, a communication controller as discussed herein. A probability determining module 1614 may correspond at least in some aspects to, for example, an access controller as discussed herein. A report determining module 1616 may correspond at least in some aspects to, for example, an identifier controller as discussed herein.

The functionality of the modules of FIGS. 12-16 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 12-16 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   acquiring an identifier associated with an access point at an access terminal;
   reporting another identifier of the access point to a serving access point of the access terminal;
   receiving, in response to the reporting of the another identifier, an indication of a time gap during which the access terminal may temporarily cease monitoring transmissions from the serving access point, wherein the identifier is acquired during the time gap;
   determining, at the access terminal, whether the access terminal is allowed to access the access point based on the identifier; and
   initiating, by the access terminal, connection re-establishment at the access point as a result of the determination.

2. The method of claim 1, wherein the determination comprises determining whether an allowed node list for the access terminal includes the identifier.

3. The method of claim 1, wherein:
   the identifier identifies a closed subscriber group of which the access point is a member; and
   the determination comprises determining whether an allowed closed subscriber group list for the access terminal includes the identifier.

4. The method of claim 1, wherein the identifier comprises a global cell identifier of the access point.

5. The method of claim 1, wherein the access terminal initiates the re-establishment by performing a random access at the access point.

6. The method of claim 1, wherein the re-establishment is initiated to cause the access point to invoke a forward handover with the serving access point of the access terminal.

7. The method of claim 1, wherein the identifier is unique within a larger region than the another identifier.

8. The method of claim 1, wherein the identifier is more unique than the another identifier such that the identifier is less likely to be subject to identifier confusion than the another identifier.

9. The method of claim 1, further comprising determining whether an indication of whether the access terminal may initiate the connection re-establishment has been received in the event the access terminal is allowed to access the access point.

10. The method of claim 9, wherein the access terminal is enabled to initiate the connection re-establishment based on the determination of whether the indication has been received.

11. The method of claim 1, wherein the re-establishment is not associated with a radio-link failure.

12. An access terminal for communication, comprising:
an identifier controller configured to acquire an identifier associated with an access point at the access terminal, and to report another identifier of the access point to a serving access point of the access terminal;
a communication controller configured to receive, in response to the reporting of the another identifier, an indication of a time gap during which the access terminal may temporarily cease monitoring transmissions from the serving access point, wherein the identifier is acquired during the time gap;
an access controller configured to determine whether the access terminal is allowed to access the access point based on the identifier; and
a handover controller configured to initiate connection re-establishment at the access point as a result of the determination.

13. The access terminal of claim 12, wherein the determination comprises determining whether an allowed node list for the access terminal includes the identifier.

14. The access terminal of claim 12, wherein:
the identifier identifies a closed subscriber group of which the access point is a member; and
the determination comprises determining whether an allowed closed subscriber group list for the access terminal includes the identifier.

15. The access terminal of claim 12, wherein the re-establishment is initiated to cause the access point to invoke a forward handover with the serving access point of the access terminal.

16. The access terminal of claim 12, wherein the handover controller is further configured to determine whether an indication of whether the access terminal may initiate the connection re-establishment has been received in the event the access terminal is allowed to access the access point.

17. An access terminal for communication, comprising:
means for acquiring an identifier associated with an access point at the access terminal;
means for reporting another identifier of the access point to a serving access point of the access terminal;
means for receiving, in response to the reporting of the another identifier, an indication of a time gap during which the access terminal may temporarily cease monitoring transmissions from the serving access point, wherein the identifier is acquired during the time gap;
means for determining whether the access terminal is allowed to access the access point based on the identifier; and
means for initiating connection re-establishment at the access point as a result of the determination.

18. The access terminal of claim 17, wherein the determination comprises determining whether an allowed node list for the access terminal includes the identifier.

19. The access terminal of claim 17, wherein:
the identifier identifies a closed subscriber group of which the access point is a member; and
the determination comprises determining whether an allowed closed subscriber group list for the access terminal includes the identifier.

20. The access terminal of claim 17, wherein the re-establishment is initiated to cause the access point to invoke a forward handover with the serving access point of the access terminal.

21. The access terminal of claim 17, further comprising means for determining whether an indication of whether the access terminal may initiate the connection re-establishment has been received in the event the access terminal is allowed to access the access point.

22. A computer-program product, comprising:
a non-transitory computer-readable medium comprising code for causing a computer to:
acquire an identifier associated with an access point at an access terminal;
report another identifier of the access point to a serving access point of the access terminal;
receive, in response to the report of the another identifier, an indication of a time gap during which the access terminal may temporarily cease monitoring transmissions from the serving access point, wherein the identifier is acquired during the time gap;
determine, at the access terminal, whether the access terminal is allowed to access the access point based on the identifier; and
initiate, by the access terminal, connection re-establishment at the access point as a result of the determination.

23. The computer-program product of claim 22, wherein the determination comprises determining whether an allowed node list for the access terminal includes the identifier.

24. The computer-program product of claim 22, wherein:
the identifier identifies a closed subscriber group of which the access point is a member; and
the determination comprises determining whether an allowed closed subscriber group list for the access terminal includes the identifier.

25. A method of communication, comprising:
receiving a first message from an access terminal at a first access point, wherein the first message includes an identifier of a second access point;
determining whether the identifier may be used to identify a set of at least one access point other than the second access point;
receiving an indication that indicates whether the access terminal has previously accessed an access point among potential target access points including the second access point and the set of at least one access point;
identifying at least one access point from the potential target access points, wherein the identification of the at least one access point is prioritized based on the indication; and
preparing the identified at least one access point for handover of the access terminal.

26. The method of claim 25, further comprising sending, to the access terminal, handover preparation information associated with the preparation of the identified at least one access point.

27. The method of claim 26, further comprising providing, with the handover preparation information, at least one other identifier of the identified at least one access point.

28. The method of claim 27, wherein:
the at least one other identifier comprises at least one global cell identifier; and
the identifier comprises a physical cell identifier of the second access point.

29. The method of claim 27, wherein the at least one other identifier is unique within a larger region than the identifier.

30. The method of claim 27, wherein the at least one other identifier is more unique than the identifier such that the at least one other identifier is less likely to be subject to identifier confusion than the identifier.

31. The method of claim 25, wherein the determination comprises determining that there is confusion associated with the use of the identifier.

32. The method of claim 25, further comprising receiving an indication of a probability that the access terminal is near an access point, among the potential target access points, that the access terminal is allowed to access, wherein the identification of the at least one access point is based on the indicated probability.

33. The method of claim 25, further comprising receiving an indication of whether the access terminal is allowed to access another access point among the potential target access points, wherein the identification of the at least one access point is prioritized based on the indication.

34. The method of claim 33, wherein the indication indicates whether an allowed closed subscriber group list for the access terminal includes a closed subscriber group identifier of the another access point.

35. The method of claim 25, further comprising:
receiving an indication of a location of the access terminal; and
determining, based on the indication, whether the access terminal is near another access point among the potential target access points, wherein the identification of the at least one access point is prioritized based on the determination of whether the access terminal is near the another access point.

36. The method of claim 35, wherein the indication of the access terminal location is based on other access points that the access terminal has previously visited.

37. An apparatus for communication, comprising:
an identifier controller configured to receive a first message from an access terminal at a first access point, wherein the first message includes an identifier of a second access point;
a confusion controller configured to determine whether the identifier may be used to identify a set of at least one access point other than the second access point; and
a handover controller configured to:
receive an indication that indicates whether the access terminal has previously accessed an access point among potential target access points including the second access point and the set of at least one access point,
identify at least one access point from the potential target access points, wherein the identification of the at least one access point is prioritized based on the indication, and
prepare the identified at least one access point for handover of the access terminal.

38. The apparatus of claim 37, wherein the handover controller is further configured to send, to the access terminal, handover preparation information associated with the preparation of the identified at least one access point.

39. The apparatus of claim 38, wherein the handover controller is further configured to provide, with the handover preparation information, at least one other identifier of the identified at least one access point.

40. The apparatus of claim 37, wherein the determination comprises determining that there is confusion associated with the use of the identifier.

41. The apparatus of claim 37, wherein:
the handover controller is further configured to receive an indication of whether the access terminal is allowed to access another access point among the potential target access points; and
the identification of the at least one access point is prioritized based on the indication.

42. The apparatus of claim 37, wherein:
the handover controller is further configured to receive an indication of a location of the access terminal and determine, based on the indication, whether the access terminal is near another access point among the potential target access points; and
the identification of the at least one access point is prioritized based on the determination of whether the access terminal is near the another access point.

43. An apparatus for communication, comprising:
means for receiving a first message from an access terminal at a first access point, wherein the first message includes an identifier of a second access point;
means for determining whether the identifier may be used to identify a set of at least one access point other than the second access point;
means for receiving an indication that indicates whether the access terminal has previously accessed an access point among potential target access points including the second access point and the set of at least one access point;
means for identifying at least one access point from the potential target access points, wherein the identification of the at least one access point is prioritized based on the indication; and
means for preparing the identified at least one access point for handover of the access terminal.

44. The apparatus of claim 43, further comprising means for sending, to the access terminal, handover preparation information associated with the preparation of the identified at least one access point.

45. The apparatus of claim 44, further comprising means for providing, with the handover preparation information, at least one other identifier of the identified at least one access point.

46. The apparatus of claim 43, wherein the determination comprises determining that there is confusion associated with the use of the identifier.

47. The apparatus of claim 43, further comprising means for receiving an indication of whether the access terminal is allowed to access another access point among the potential target access points, wherein the identification of the at least one access point is prioritized based on the indication.

48. The apparatus of claim 43, further comprising means for receiving an indication of a location of the access terminal and for determining, based on the indication, whether the access terminal is near another access point among the potential target access points, wherein the identification of the at least one access point is prioritized based on the determination of whether the access terminal is near the another access point.

49. A computer-program product, comprising:
a non-transitory computer-readable medium comprising code for causing a computer to:
receive a first message from an access terminal at a first access point, wherein the first message includes an identifier of a second access point;
determine whether the identifier may be used to identify a set of at least one access point other than the second access point;
receive an indication that indicates whether the access terminal has previously accessed an access point among potential target access points including the second access point and the set of at least one access point identify at least one access point from the potential target access points, wherein the identification of the at least one access point is prioritized based on the indication; and prepare the identified at least one access point for handover of the access terminal.

50. The computer-program product of claim 49, wherein the computer-readable medium further comprises code for causing the computer to send, to the access terminal, handover preparation information associated with the preparation of the identified at least one access point.

51. The computer-program product of claim 50, wherein the computer-readable medium further comprises code for causing the computer to provide, with the handover preparation information, at least one other identifier of the identified at least one access point.

52. A method of communication, comprising:
receiving a first message at an access terminal, wherein the first message includes an identifier of an access point;
receiving a second message, from a source access point, at the access terminal, wherein the second message includes handover preparation information associated with preparation of at least one access point for handover of the access terminal, and wherein the second message further includes at least one identifier of the at least one access point;
determining whether the at least one identifier included in the second message includes the identifier of the access point; and
performing a handover of the access terminal to the access point based on the determination.

53. The method of claim 52, wherein, if the at least one identifier included in the second message includes the identifier of the access point, the performance of the handover uses a portion of the handover preparation information that corresponds to the access point.

54. The method of claim 52, wherein, if the at least one identifier included in the second message does not include the identifier of the access point, the performance of the handover comprises initiating connection re-establishment at the access point.

55. The method of claim 52, wherein the second message is received from a serving access point of the access terminal.

56. The method of claim 52, wherein the identifier of the access point comprises a global cell identifier of the access point.

57. The method of claim 52, further comprising:
reporting another identifier of the access point to a serving access point of the access terminal; and
receiving, in response to the reporting of the another identifier, an indication of a time gap during which the access terminal may temporarily cease monitoring transmissions from the serving access point, wherein the identifier of the access point is acquired during the time gap.

58. The method of claim 57, wherein the identifier of the access point is unique within a larger region than the another identifier.

59. The method of claim 57, wherein the identifier of the access point is more unique than the another identifier such that the identifier of the access point identifier is less likely to be subject to identifier confusion than the another identifier.

60. The method of claim 57, wherein the indication of the time gap is received with the handover preparation information.

61. The method of claim 57, further comprising:
determining a probability regarding whether the access terminal is near the access point and whether the access terminal is allowed to access the access point; and
determining whether to report the another identifier based on the determined probability.

62. An apparatus for communication, comprising:
an identifier controller configured to receive a first message at an access terminal, wherein the first message includes an identifier of an access point; and
a handover controller configured to receive a second message, from a source access point, at the access terminal, wherein the second message includes handover preparation information associated with preparation of at least one access point for handover of the access terminal, and wherein the second message further includes at least one identifier of the at least one access point, the handover controller further configured to:
determine whether the at least one identifier included in the second message includes the identifier of the access point; and
perform a handover of the access terminal to the access point based on the determination.

63. The apparatus of claim 62, wherein, if the at least one identifier included in the second message includes the identifier of the access point, the performance of the handover uses a portion of the handover preparation information that corresponds to the access point.

64. The apparatus of claim 62, wherein, if the at least one identifier included in the second message does not include the identifier of the access point, the performance of the handover comprises initiating connection re-establishment at the access point.

65. The apparatus of claim 62, wherein:
the identifier controller is further configured to report another identifier of the access point to a serving access point of the access terminal; and
the apparatus further comprises a communication controller configured to receive, in response to the reporting of the another identifier, an indication of a time gap during which the access terminal may temporarily cease monitoring transmissions from the serving access point, wherein the identifier of the access point is acquired during the time gap.

66. The apparatus of claim 65, wherein:
the apparatus further comprises an access controller configured to determine a probability regarding whether the access terminal is near the access point and whether the access terminal is allowed to access the access point; and
the identifier controller is further configured to determine whether to report the another identifier based on the indication.

67. An apparatus for communication, comprising:
means for receiving a first message at an access terminal, wherein the first message includes an identifier of an access point;
means for receiving a second message, from a source access point, at the access terminal, wherein the second message includes handover preparation information associated with preparation of at least one access point for handover of the access terminal, and wherein the second message further includes at least one identifier of the at least one access point;

means for determining whether the at least one identifier included in the second message includes the identifier of the access point; and means for performing a handover of the access terminal to the access point based on the determination.

68. The apparatus of claim 67, wherein, if the at least one identifier included in the second message includes the identifier of the access point, the performance of the handover uses a portion of the handover preparation information that corresponds to the access point.

69. The apparatus of claim 67, wherein, if the at least one identifier included in the second message does not include the identifier of the access point, the performance of the handover comprises initiating connection re-establishment at the access point.

70. The apparatus of claim 67, further comprising:

means for reporting another identifier of the access point to a serving access point of the access terminal; and means for receiving, in response to the reporting of the another identifier, an indication of a time gap during which the access terminal may temporarily cease monitoring transmissions from the serving access point, wherein the identifier of the access point is acquired during the time gap.

71. The apparatus of claim 70, further comprising:

means for determining a probability regarding whether the access terminal is near the access point and whether the access terminal is allowed to access the access point; and means for determining whether to report the another identifier based on the indication.

72. A computer-program product, comprising:

a non-transitory computer-readable medium comprising code for causing a computer to:

receive a first message at an access terminal, wherein the first message includes an identifier of an access point;

receive a second message, from a source access point, at the access terminal, wherein the second message includes handover preparation information associated with preparation of at least one access point for handover of the access terminal, and wherein the second message further includes at least one identifier of the at least one access point;

determine whether the at least one identifier included in the second message includes the identifier of the access point; and perform a handover of the access terminal to the access point based on the determination.

73. The computer-program product of claim 72, wherein, if the at least one identifier included in the second message includes the identifier of the access point, the performance of the handover uses a portion of the handover preparation information that corresponds to the access point.

74. The computer-program product of claim 72, wherein, if the at least one identifier included in the second message does not include the identifier of the access point, the performance of the handover comprises initiating connection re-establishment at the access point.

* * * * *